(12) United States Patent
Brebion et al.

(10) Patent No.: US 11,285,696 B2
(45) Date of Patent: Mar. 29, 2022

(54) PACKAGING FILM FOR ORGANOLEPTIC SENSITIVE PRODUCT, AND PROCESS, PACKAGING ARTICLE, AND PACKAGED PRODUCT THEREOF

(71) Applicant: Cryovac, LLC, Charlotte, NC (US)

(72) Inventors: Herve Brebion, Simpsonville, SC (US); Paul Satterwhite, Simpsonville, SC (US)

(73) Assignee: Cryovac, LLC, Charlotte, NC (US)

( * ) Notice: Subject to any disclaimer, the term of this patent is extended or adjusted under 35 U.S.C. 154(b) by 178 days.

(21) Appl. No.: 16/341,676

(22) PCT Filed: Oct. 13, 2017

(86) PCT No.: PCT/US2017/056455
§ 371 (c)(1),
(2) Date: Apr. 12, 2019

(87) PCT Pub. No.: WO2018/071742
PCT Pub. Date: Apr. 19, 2018

(65) Prior Publication Data
US 2020/0039173 A1    Feb. 6, 2020

Related U.S. Application Data

(60) Provisional application No. 62/483,675, filed on Apr. 10, 2017, provisional application No. 62/408,323, filed on Oct. 14, 2016.

(51) Int. Cl.
*B32B 7/12*       (2006.01)
*B32B 27/28*      (2006.01)
(Continued)

(52) U.S. Cl.
CPC .............. *B32B 7/12* (2013.01); *B32B 27/28* (2013.01); *B32B 27/30* (2013.01); *B32B 27/36* (2013.01); *B32B 2307/72* (2013.01)

(58) Field of Classification Search
CPC .......... B32B 7/12; B32B 27/28; B32B 27/30; B32B 27/36
(Continued)

(56) References Cited

U.S. PATENT DOCUMENTS

| 2,956,383 A | 10/1960 | Gausman |
| 3,045,404 A | 7/1962 | Wilson |

(Continued)

FOREIGN PATENT DOCUMENTS

EP         248661 A1       12/1987

OTHER PUBLICATIONS

Material Data Center, Datasheet Eastar 6763 (Year: 2021).*

*Primary Examiner* — Betelhem Shewareged
(74) *Attorney, Agent, or Firm* — Jason R. Womer

(57) ABSTRACT

A multilayer film for use in packaging organoleptic sensitive products has the structure seal/bulk/tie #1/core/tie #2/tie #3/odor barrier, in which the seal layer contains a homogeneous ethylene/α-olefin copolymer having a density of at least 0.906 g/cc. The odor barrier contains a polyester, amorphous polyamide, polycarbonate, polyvinylalcohol, and/or cyclic olefin copolymer. The 7-layer film above, and variants thereof, can be produced by coextrusion, extrusion coating, lamination (via adhesive, heat, etc). Packaging articles include pouches. Packaged products have the organoleptic sensitive product in the pouch made from the film, or made from a film without the odor barrier layer, with the pouch being sealed inside a separate bag containing the odor barrier layer.

17 Claims, 4 Drawing Sheets

(51) Int. Cl.
*B32B 27/30* (2006.01)
*B32B 27/36* (2006.01)

(58) Field of Classification Search
USPC .......................................................... 428/213
See application file for complete search history.

(56) References Cited

U.S. PATENT DOCUMENTS

| | | |
|---|---|---|
| 3,741,253 A | 6/1973 | Brax et al. |
| 4,589,247 A | 5/1986 | Tsuruta et al. |
| 6,379,812 B1 | 4/2002 | Hofmeister |
| 6,780,373 B1 | 8/2004 | Musco |
| 7,041,352 B2 | 5/2006 | Barber et al. |
| 7,611,770 B2 | 11/2009 | Kennedy et al. |
| 7,686,907 B1 * | 3/2010 | Woolley ............... B29C 66/3242 156/155 |
| 8,012,520 B2 | 9/2011 | Mudar et al. |
| 8,568,894 B2 | 10/2013 | Bernal-lara et al. |
| 2001/0010846 A1 | 8/2001 | Hofmeister et al. |
| 2004/0013862 A1 | 1/2004 | Brebion et al. |
| 2005/0003125 A1 | 1/2005 | Barber et al. |
| 2008/0103463 A1 * | 5/2008 | Tsai ........................... B32B 7/12 604/317 |
| 2012/0264207 A1 * | 10/2012 | Sharpe .................... G03C 5/56 435/307.1 |
| 2014/0075895 A1 | 3/2014 | O'Connor |
| 2020/0103463 A1 * | 4/2020 | Yanagisawa ......... B25J 15/0633 |

* cited by examiner

PACKAGING FILM FOR ORGANOLEPTIC SENSITIVE PRODUCT, AND PROCESS, PACKAGING ARTICLE, AND PACKAGED PRODUCT THEREOF

BACKGROUND

The presently disclosed subject matter relates generally to polymeric films, and more specifically to polymeric films suitable for use in packaging consumable products, such as water.

Organoleptic-sensitive products such as water have been successfully packaged in bottles made from polyesters and other rigid resin options for some time. This type of packaging is particularly suitable for water because the polyester resin that comprises the bottle does not impart any detectable undesirable taste or flavor to the stored water. It is believed that the unwanted taste or flavor found in packaged beverages can be attributed to extractables leached from certain resins. Specifically, it is theorized that the inner sealant layer resin of the packaging film structures plays the most important role since it comes into direct contact with the beverage. Therefore, bottles made from polyesters and other rigid materials are desirable for packaging water because minimal extractables are usually recorded. However, these bottles have a number of undesirable features, such as rigidity, excess weight, and limited portability.

Flexible pouches are starting to displace polycarbonate based bottles in the marketplace for water dispensing units, due to customer concerns over jug cleanliness and presence of phthalates in polycarbonates. These flexible pouches, which are run on vertical form fill seal packaging equipment, need to have excellent abuse resistance during handling immediately after packing and throughout distribution. They need also to exhibit good conformity to the piercing probe used on the water dispensing unit to avoid leakage inside the unit. They also need to maintain the water organoleptics throughout the package life. Flexible pouches used in this market are either solely polyolefin based or polyolefin based with a nylon core. Running heavy water pouches (5-7 liters) on vertical form fill seal packaging machinery, the presence of nylon layer(s) is required for seal integrity and weight consistency reasons. The film itself should not taint the water during storage due to its composition, or the way the film is processed, and/or the way the film is affected by the water, which can contain a small quantity of an oxidizing agent for microbiological control.

It has been discovered that the films used in this market lack adequate organoleptic barrier properties to provide a sufficient barrier to external source of tainting. One of the primary causes of external tainting is the cardboard boxes in which the pouches are stored into. Cardboard contains non-negligible amounts of recycled fibers to which various additives including biocides. Moreover, fillers and/or bleaching agents are added during the cardboard production. Also, the presence of moisture in the cardboard increases its odor and contributes to the migration of odorant molecules from the ambient into the water contained in the pouches. Molecules derived from carbon sulfides, decenal, 4-methylphenol or 2-nonenal are among potential compounds with high odor impact capable of tainting the water.

Coextruded films containing an EVOH layer have been considered to prevent water tainting from an external source but the presence of an EVOH is detrimental to the pouch abuse properties resulting in excess pinholing and pouch breakage immediately after pouch filling. The presence of an EVOH layer in the film also results in poor conformity to the piercing probe resulting in leakage inside the water dispenser.

Therefore, it would be desirable to have a flexible, low weight, portable packaging article for packaging, storing, and dispensing organoleptic-sensitive products (such as water) with minimal extractables and high abuse resistance.

SUMMARY OF THE INVENTION

A new film, packaging article, process, and packaged product disclosed herein has the advantage of using a thin layer of a PETG containing layer to provide the odor/taste barrier properties while maintaining the abuse and piercing properties required for a water packaging application.

A first aspect is directed to a multilayer film for use in packaging organoleptic sensitive products. The film has an outer sealant layer, a bulk layer, a first tie layer, a core layer, a second tie layer, a third tie layer, and an odor barrier layer. The outer sealant layer comprises a homogeneous ethylene/α-olefin copolymer having a density of at least 0.906 g/cc. The bulk layer comprises an ethylene/α-olefin copolymer having a density of from 0.89 to 0.93 g/cm$^3$. The first bulk layer is between the seal layer and the core layer. The first tie layer is between the sealant layer and the core layer, and the first tie layer comprises a first modified polyolefin. The core layer comprises at least one member selected from the group consisting of polyamide, saponified ethylene/vinyl acetate copolymer, polyvinylidene chloride. The second tie layer is between the core layer and the odor barrier tie layer. The second tie layer comprises a second modified polyolefin. The third tie layer comprises a modified ethylene/α-olefin copolymer having a density of from 0.89 to 0.93 g/cm$^3$. The third tie is between the second tie layer and the odor barrier layer. The odor barrier layer comprises at least one member selected from the group consisting of a polyester, amorphous polyamide, polycarbonate, polyvinylalcohol, and/or cyclic olefin copolymer. Further embodiments of the first aspect are disclosed in the detailed description, below.

A second aspect is directed to a process for producing a multilayer film comprising coextruding a multilayer film for use in packaging organoleptic sensitive products. The coextruded layers comprise: (A) an outer sealant layer comprising homogeneous ethylene/α-olefin copolymer having a density of at least 0.906 g/cc; (B) a bulk layer comprising an ethylene/α-olefin copolymer having a density of from 0.89 to 0.93 g/cm$^3$, the first bulk layer being between the seal layer and the core layer; (C) a first tie layer between the sealant layer and the core layer, the first tie layer comprising a first modified polyolefin; (D) a core layer comprising at least one member selected from the group consisting of polyamide, saponified ethylene/vinyl acetate copolymer, polyvinylidene chloride; (E) a second tie layer between the core layer and the odor barrier tie layer, the second tie layer comprising a second modified polyolefin; (F) a third tie layer comprising a modified ethylene/α-olefin copolymer having a density of from 0.89 to 0.93 g/cm$^3$, the third tie layer being between the second tie layer and the odor barrier layer and (G) an odor barrier layer comprising at least one member selected from the group consisting of a polyester, amorphous polyamide, polycarbonate, polyvinylalcohol, and/or cyclic olefin copolymer.

In an embodiment of the second aspect, the coextrusion is carried out in an upward blown film process.

In an embodiment of the second aspect, the coextrusion is carried out in a downward blown film process.

In an embodiment of the second aspect, the coextrusion is carried out in a downward cast film process.

In an embodiment of the second aspect, the seal layer is coextruded at a temperature of from 345° F. to 395° F., or from 350° F. to 390° F., or from 350° C. to 380° F., or from 350° F. to 370° F., or from 350° F. to 360° F., or about 350° F.

In an embodiment of the second aspect, the coextrusion is carried out in a manner so as to produce a coextruded multilayer film according to any of the embodiments of the first aspect of the invention.

In an embodiment of the second aspect, the multilayer film has an elongation at break of at least 200%.

A third aspect is directed to a form-fill-seal packaging article comprising a multilayer film having a seal layer heat sealed to itself and an outer odor barrier layer. The packaging article comprises a backseam fin seal, a first end seal, and a second end seal. The backseam fin seal runs a length of the packaging article. The backseam fin seal is a heat seal of the seal layer to itself. The backseam fin seal converts the multilayer film into a backseamed tubing. The first end seal is at a first end of the backseamed tubing. The first end seal is transverse to the backseam fin seal. The first end seal conforms a first end seal portion of the backseamed tubing into a first lay-flat configuration. The second end seal is at a second end of the backseamed tubing. The second end seal is also transverse to the backseam fin seal. The second end seal conforms a second end seal portion of the backseamed tubing into a second lay-flat configuration. The multilayer film comprises: (i) an outer sealant layer comprising homogeneous ethylene/α-olefin copolymer having a density of at least 0.906 g/cc; (ii) a bulk layer comprising an ethylene/α-olefin copolymer having a density of from 0.89 to 0.93 g/cm$^3$, the first bulk layer being between the seal layer and the core layer (iii) a first tie layer between the sealant layer and the core layer, the first tie layer comprising a first modified polyolefin; (iv) a core layer comprising at least one member selected from the group consisting of polyamide, saponified ethylene/vinyl acetate copolymer, polyvinylidene chloride; (v) a second tie layer between the core layer and the odor barrier tie layer, the second tie layer comprising a second modified polyolefin; (vi) a third tie layer comprising a modified ethylene/α-olefin copolymer having a density of from 0.89 to 0.93 g/cm$^3$, the third tie being between the second tie layer and the odor barrier layer; and (vii) an odor barrier layer comprising at least one member selected from the group consisting of a polyester, amorphous polyamide, polycarbonate, polyvinylalcohol, and/or cyclic olefin copolymer.

In an embodiment of the third aspect, the outer sealant layer is in accordance with the outer sealant layer of the first aspect.

In an embodiment of the third aspect, the first bulk layer is in accordance with the bulk layer of the first aspect.

In an embodiment of the third aspect, the first tie layer is in accordance with the first tie layer of the first aspect.

In an embodiment of the third aspect, the core layer is in accordance with the core layer of the first aspect.

In an embodiment of the third aspect, the second tie layer is in accordance with the first tie layer of the first aspect.

In an embodiment of the third aspect, the third tie layer is in accordance with the third tie layer of the first aspect.

In an embodiment of the third aspect, the odor barrier layer is in accordance with the odor barrier layer of the first aspect.

In an embodiment of the third aspect, the multilayer film is a coextruded film.

In an embodiment of the third aspect, the multilayer film has an elongation at break of at least 200%, or any other elongation at break of the first aspect.

A fourth aspect is directed to a multilayer laminate comprising (A) a coextruded multilayer film, (B) a lamination adhesive layer, and (C) an odor barrier layer. The coextruded multilayer film comprises: (i) an outer sealant layer comprising homogeneous ethylene/α-olefin copolymer having a density of at least 0.906 g/cc; (ii) a first bulk layer comprising an ethylene/α-olefin copolymer having a density of from 0.89 to 0.93 g/cm$^3$, the first bulk layer being between the seal layer and the core layer; (iii) a first tie layer between the sealant layer and the core layer, the first tie layer comprising a first modified polyolefin; (iv) a core layer comprising at least one member selected from the group consisting of polyamide, saponified ethylene/vinyl acetate copolymer, polyvinylidene chloride; (v) a second tie layer between the core layer and the skin tie layer, the second tie layer comprising a second modified polyolefin; (vi) a second bulk layer comprising an ethylene/α-olefin copolymer having a density of from 0.89 to 0.93 g/cm$^3$, the second bulk layer being between the second tie layer and the skin layer; and (vii) a skin layer comprising at least one member selected from the group consisting of polyolefin, polyamide, polyvinylidene chloride, and ethylene/vinyl alcohol copolymer. The lamination adhesive layer has a first principal surface adhered to the surface of the skin layer opposite the second bulk layer of the multilayer film. The odor barrier layer comprises at least one member selected from the group consisting of a polyester, amorphous polyamide, polycarbonate, polyvinylalcohol, and/or cyclic olefin copolymer.

In an embodiment of the fourth aspect, the outer sealant layer is in accordance with the outer sealant layer of the first aspect.

In an embodiment of the fourth aspect, the first bulk layer is in accordance with the bulk layer of the first aspect.

In an embodiment of the fourth aspect, the first tie layer is in accordance with the first tie layer of the first aspect.

In an embodiment of the fourth aspect, the core layer is in accordance with the core layer of the first aspect.

In an embodiment of the fourth aspect, the second tie layer is in accordance with the first tie layer of the first aspect.

In an embodiment of the fourth aspect, the second bulk layer comprises an ethylene/α-olefin copolymer having a density of from 0.89 to 0.920 g/cm$^3$, and a melt index of less than 2.0 g/10 min.

In an embodiment of the fourth aspect, the odor barrier layer is in accordance with the odor barrier layer of the first aspect.

In an embodiment of the fourth aspect, the multilayer film is in accordance with the multilayer film of the first aspect.

In an embodiment of the fourth aspect, the multilayer film has an elongation at break of at least 200%, or any other elongation at break of the first aspect.

A fifth aspect is directed to a process for producing an adhesive-laminated film comprising coextruding a first multilayer film, and laminating a second film to the first multilayer film. The first multilayer film comprises: (i) an outer sealant layer comprising homogeneous ethylene/α-olefin copolymer having a density of at least 0.906 g/cc; (ii) a bulk layer comprising an ethylene/α-olefin copolymer having a density of from 0.89 to 0.93 g/cm$^3$, the first bulk layer being between the seal layer and the core layer; (iii) a first tie layer between the sealant layer and the core layer, the first tie layer comprising a first modified polyolefin; (iv) a core layer comprising at least one member selected from the group consisting of polyamide, saponified ethylene/vinyl acetate copolymer, polyvinylidene chloride; (v) a second tie layer between the core layer and the skin tie layer, the second tie layer comprising a second modified polyolefin; (vi) a second bulk layer comprising an ethylene/α-olefin copolymer having a density of from 0.89 to 0.93 g/cm$^3$, the second bulk layer being between the second tie layer and the skin layer; and (vii) an outer skin layer comprising at least one member selected from the group consisting of polyolefin, polyamide, polyvinylidene chloride, and ethylene/vinyl alcohol copolymer. The second film comprises an odor barrier layer to an outer surface of the outer skin layer. The laminating is carried out with a lamination adhesive. The odor barrier layer comprises at least one member selected from the group consisting of a polyester, amorphous polyamide, polycarbonate, polyvinylalcohol, and/or cyclic olefin copolymer.

In an embodiment of the fifth aspect, the coextrusion is carried out in an upward blown film process.

In an embodiment of the fifth aspect, the coextrusion is carried out in a downward upward blown film process.

In an embodiment of the fifth aspect, the coextrusion is carried out in a downward cast film process.

In an embodiment of the fifth aspect, the seal layer is coextruded at a temperature of from 345° F. to 395° F., or from 350° F. to 390° F., or from 350° C. to 380° F., or from 350° F. to 370° F., or from 350° F. to 360° F., or at about 350° F.

A sixth aspect is directed to a form-fill-seal packaging article comprising a multilayer film having a seal layer heat sealed to itself and an odor barrier layer. The packaging article comprises: (A) a backseam fin seal running a length of the packaging article, the backseam fin seal being a heat seal of the seal layer to itself, the backseam fin seal converting the multilayer film into a backseamed tubing; (B) a first end seal at a first end of the backseamed tubing, the first end seal being transverse to the backseam fin seal, the first end seal conforming a first end seal portion of the backseamed tubing into a first lay-flat configuration; and (C) a second end seal at a second end of the backseamed tubing, the second end seal also being transverse to the backseam fin seal, the second end seal conforming a second end seal portion of the backseamed tubing into a second lay-flat configuration. The multilayer film comprises: (i) an outer sealant layer comprising homogeneous ethylene/α-olefin copolymer having a density of at least 0.906 g/cc; (ii) a first bulk layer comprising an ethylene/α-olefin copolymer having a density of from 0.89 to 0.93 g/cm$^3$, the first bulk layer being between the seal layer and the core layer; (iii) a first tie layer between the sealant layer and the core layer, the first tie layer comprising a first modified polyolefin; (iv) a core layer comprising at least one member selected from the group consisting of polyamide, saponified ethylene/vinyl acetate copolymer, polyvinylidene chloride; (v) a second tie layer between the core layer and the skin tie layer, the second tie layer comprising a second modified polyolefin; (vi) a second bulk layer comprising an ethylene/α-olefin copolymer having a density of from 0.89 to 0.93 g/cm$^3$, the second bulk layer being between the second tie layer and the skin layer; and (vii) a skin layer comprising at least one member selected from the group consisting of polyolefin, polyamide, polyvinylidene chloride, and ethylene/vinyl alcohol copolymer; (xiii) a lamination adhesive layer having a first principal surface adhered to the surface of the skin layer opposite the second bulk layer of the multilayer film; and (ix) an odor barrier layer having a first principal surface directly or indirectly adhered to the second principal surface of the lamination adhesive layer, the odor barrier layer comprising at least one member selected from the group consisting of a polyester, amorphous polyamide, polycarbonate, polyvinylalcohol, and/or cyclic olefin copolymer.

In an embodiment of the sixth aspect, the outer sealant layer is in accordance with the outer sealant layer of the first aspect.

In an embodiment of the sixth aspect, the first bulk layer is in accordance with the bulk layer of the first aspect.

In an embodiment of the sixth aspect, the first tie layer is in accordance with the first tie layer of the first aspect.

In an embodiment of the sixth aspect, the core layer is in accordance with the core layer of the first aspect.

In an embodiment of the sixth aspect, the second tie layer is in accordance with the first tie layer of the first aspect.

In an embodiment of the sixth aspect, the second bulk layer comprises an ethylene/α-olefin copolymer having a density of from 0.89 to 0.920 g/cm$^3$, and a melt index of less than 2.0 g/10 min.

In an embodiment of the sixth aspect, the odor barrier layer is in accordance with the odor barrier layer of the first aspect.

In an embodiment of the sixth aspect, the multilayer film is in accordance with the multilayer film of the first aspect.

In an embodiment of the sixth aspect, the multilayer film has an elongation at break of at least 200%, or any other elongation at break of the first aspect.

A seventh aspect is directed to a packaging article comprising an inner pouch inside an outer pouch. The inner pouch is made from a multilayer film comprising: (a) an outer sealant layer comprising homogeneous ethylene/α-olefin copolymer having a density of at least 0.906 g/cc; (b) a bulk layer comprising an ethylene/α-olefin copolymer having a density of from 0.89 to 0.93 g/cm$^3$, the first bulk layer being between the seal layer and the core layer; (c) a first tie layer between the sealant layer and the core layer, the first tie layer comprising a first modified polyolefin; and (d) a core layer comprising at least one member selected from the group consisting of polyamide, saponified ethylene/vinyl acetate copolymer, polyvinylidene chloride, (e) a second tie layer between the core layer and the skin tie layer, the second tie layer comprising a second modified polyolefin; (f) a second bulk layer comprising an ethylene/α-olefin copolymer having a density of from 0.89 to 0.93 g/cm$^3$, the second bulk layer being between the second tie layer and the skin layer; and (g) a skin layer comprising at least one member selected from the group consisting of polyolefin, polyamide, polyvinylidene chloride, and ethylene/vinyl alcohol copolymer. The outer pouch is made from a film comprising an odor barrier layer which comprises at least one member selected from the group consisting of a polyester, amorphous polyamide, polycarbonate, polyvinylalcohol, and/or cyclic olefin copolymer.

In an embodiment of the seventh aspect, the multilayer film from which the inner pouch is made is a coextruded film.

In an embodiment of the seventh aspect, the outer sealant layer is in accordance with the outer sealant layer of the first aspect.

In an embodiment of the seventh aspect, the first bulk layer is in accordance with the bulk layer of the first aspect.

In an embodiment of the seventh aspect, the first tie layer is in accordance with the first tie layer of the first aspect.

In an embodiment of the seventh aspect, the core layer is in accordance with the core layer of the first aspect.

In an embodiment of the seventh aspect, the second tie layer is in accordance with the first tie layer of the first aspect.

In an embodiment of the seventh aspect, the second bulk layer comprises an ethylene/α-olefin copolymer having a density of from 0.89 to 0.920 g/cm³, and a melt index of less than 2.0 g/10 min.

In an embodiment of the seventh aspect, the odor barrier layer is in accordance with the odor barrier layer of the first aspect.

In an embodiment of the seventh aspect, the multilayer film is in accordance with the multilayer film of the first aspect.

In an embodiment of the seventh aspect, the multilayer film has an elongation at break of at least 200%, or any other elongation at break of the first aspect.

An eighth aspect is directed to a packaged product comprising an organoleptic sensitive product inside a hermetically sealed packaging article according to the third aspect or the sixth aspect.

In an embodiment of the eighth aspect, the organoleptic sensitive product comprises water. In an embodiment, the organoleptic sensitive product is water.

In an embodiment of the eighth aspect, the hermetically sealed packaging article is inside a container comprising cardboard. In an embodiment, the cardboard comprises corrugated cardboard.

A ninth aspect is directed to a packaging article according to the third aspect or the sixth aspect, further comprising a fitment for dispensing a flowable product, the fitment being installed in the multilayer film.

In an embodiment of the ninth aspect, the multilayer film has an elongation at break of at least 200% or any other elongation at break of the first aspect.

DETAILED DESCRIPTION

Figure 1:
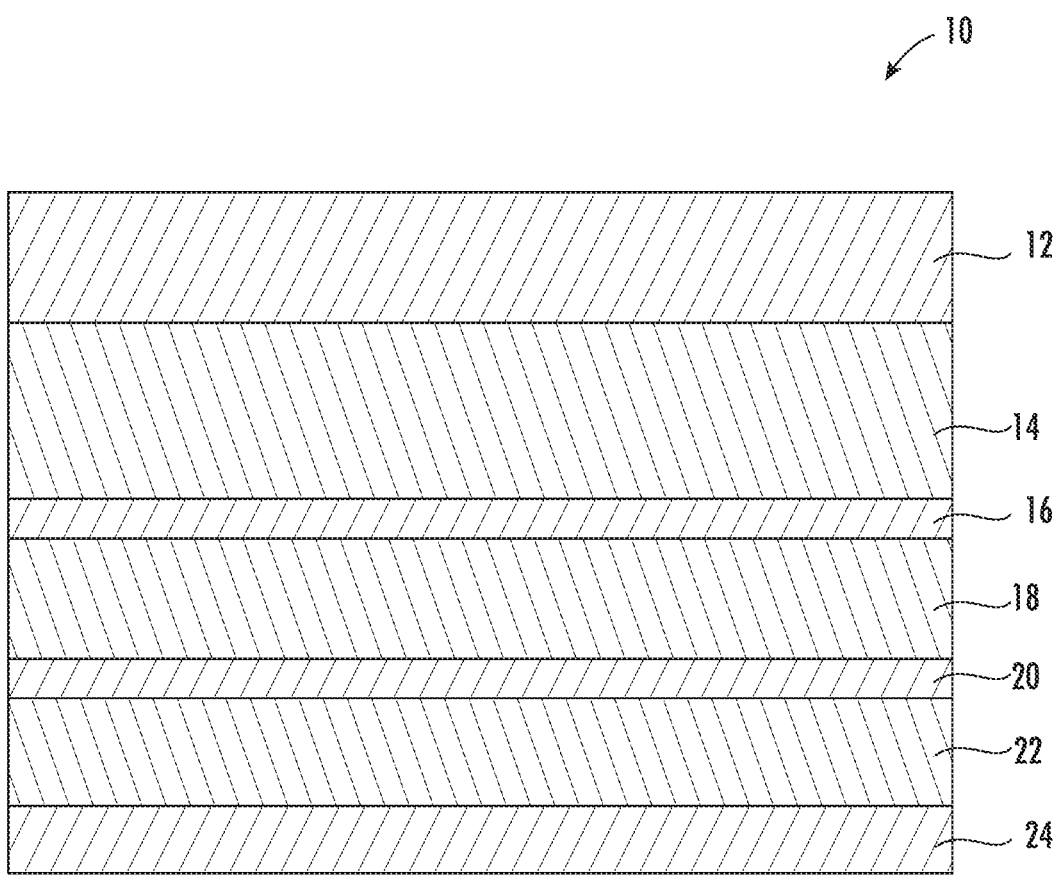
FIG. 1 is a cross-sectional view of one embodiment of a multilayer film in accordance with some embodiments of the presently disclosed subject matter.

As used herein, the term "adhered" as applied to layers of a multilayer film (or multilayer laminated article) refers to the positioning of two layers in contact with one another with or without an intervening layer (such as a tie layer), adhesive, or other layer therebetween. The phrase "directly adhered" refers to layers in direct contact with one another, with no intervening layer(s). The phrase "indirectly adhered" refers to layers not in direct contact with one another, i.e., with one or more intervening layers.

As used herein, the term "polymer" refers to the product of a polymerization reaction, and can be inclusive of homopolymers, copolymers, terpolymers, etc. In some embodiments, the layers of a film can consist essentially of a single polymer, or can contain one or more additional polymers present as a blend. As used herein, the term "polymer" and the term "resin" are used interchangeably, and are considered to be equivalents to one another.

As used herein, the term "polyolefin" refers to any polymerized olefin, which can be linear, branched, cyclic, aliphatic, aromatic, substituted, or unsubstituted. More specifically, included in the term "polyolefin" are homopolymers of olefin, copolymers of olefin, co-polymers of an olefin and a non-olefinic comonomer co-polymerizable with the olefin, such as vinyl monomers, modified polymers thereof, and the like.

The polyolefin can be a copolymer (including terpolymer, etc) made up of at least 50 wt % olefin-derived units, examples of which include ethylene/$C_{3-16}$ α-olefin copolymers, and combinations thereof. The polyolefin can comprise mer units derived from any olefin, including preferably one or more of ethylene, propylene, 1-butene, isobutylene, 2-butene, cyclobutene, 1-pentene, 1-hexene, 4-methyl-1-pentene, 1-octene, 3-methyl-1-butene, 4-methyl-1-butene, cyclopentene, 1-hexene, cyclohexene, 1-octene, 1-decene, 1-dodecene, and combinations thereof.

As used herein, the phrases "ethylene/alpha-olefin copolymer" and "ethylene/α-olefin copolymer" include heterogeneous copolymer such as Ziegler Natta ("Z-N") catalyzed ("Z-N") linear low density polyethylene (LLDPE) with a density usually in the range of from about 0.915 g/cm³ to about 0.930 g/cm³, Z-N linear medium density polyethylene (LMDPE) with a density usually in the range of from about 0.930 g/cm³ to about 0.945 g/cm³, and Z-N very low and ultra low density polyethylene (VLDPE and ULDPE) with a density lower than about 0.915 g/cm³. VLDPE can have a density within the range of from 0.880 g/cm³ to about 0.912 g/cm³, as well as a melt index of from 0.5 to 5 g/10 minutes. Moreover, these phrases include homogeneous copolymers such as metallocene-catalyzed EXACT® and EXCEED® copolymer from Exxon, single-site AFFINITY® resins from Dow, and TAFMER® copolymer from Mitsui. All these materials can include co-polymers of ethylene with one or more co-monomers selected from $C_4$-$C_{10}$ α-olefins including butene-1, hexene-1, octene-1, etc., in which the molecules of the copolymers include long chains with relatively few side chain branches or cross-linked structures.

As used herein, the terms "barrier" and "barrier layer" as applied to films and/or film layers, refer to the ability of a film or film layer to serve as a barrier to gases and/or odors. Polymers providing low $O_2$-transmission rate ("OTR") include ethylene/vinyl alcohol copolymer (EVOH) and polyvinylidene dichloride (PVDC), polyamide, co-polyamide, poly(glycolic acid), polyester, polyacrylonitrile (available as BAREX™ resin), as well as vinylidene chloride copolymer(s) including vinylidene chloride/methyl acrylate copolymer, vinylidene chloride/vinyl chloride copolymer. An $O_2$-barrier layer may include a blend of one or more of the above low OTR resins, or blends thereof.

Oxygen barrier materials can further comprise high aspect ratio fillers that create a tortuous path for permeation (e.g., nanocomposites). Oxygen barrier properties can be further enhanced by the incorporation of an oxygen scavenger, such as an organic oxygen scavenger. In some embodiments, metal foil, metallized substrates (e.g., metallized polyethylene terephthalate ("PET"), metallized polyamide, and/or metallized polypropylene), and/or coatings comprising SiOx or AlOx compounds can be used to provide low oxygen transmission to a package.

In some embodiments, a barrier layer can have a gas (e.g., oxygen) permeability of less than or equal to about 500 cc/m²/24 hrs/atm at 73° F., in some embodiments less than about 100 cc/m²/24 hrs/atm at 73° F., in some embodiments less than about 50 cc/m²/24 hrs/atm at 73° F., and in some embodiments less than about 25 cc/m$^2$/24 hrs/atm at 73° F., in accordance with ASTM D-3985.

The entire contents of all referenced ASTMs herein are incorporated by reference.

The term "bulk layer" as used herein refers to a layer used to increase the abuse-resistance, toughness, modulus, etc., of a film. In some embodiments, the bulk layer can comprise polyolefin (including but not limited to) at least one member selected from the group comprising ethylene/alpha-olefin copolymer, ethylene/alpha-olefin copolymer plastomer, low density polyethylene, linear low density polyethylene, and/or polyethylene vinyl acetate copolymers.

The term "container" as used herein includes, but is not limited to, any of a wide variety of packages or storage devices including pouches, bags, boxes, cartons, envelopes, bottles, and the like constructed from a polymeric film. The term "container" also includes any packaging or storage device that has been designed for or in support of bioprocessing applications.

As used herein, "elastomer" refers to any polymer or composition of polymers (such as blends of polymers) consistent with the ASTM D1566 definition. Elastomer includes mixed blends of polymers such as melt mixing and/or reactor blends of polymers.

As used herein, "film" includes plastic web, regardless of whether it is a traditional film (up to 10 mils in thickness) or sheet (greater than 10 mils in thickness).

As used herein, "linear low density polyethylene" or "LLDPE" refers to a copolymer comprising ethylene mer units and from 1-20 wt % of higher α-olefin mer units. In some embodiments, the α-olefin mer comprises at least one member selected from the group consisting of 1-butene, 3-methyl-1-butene, 3-methyl-1-pentene, 1-hexene, 4-methyl-1-pentene, 3-methyl-1-hexene, 1-octene and 1-decene.

As used herein, "low density polyethylene" or "LDPE" refers to an ethylene homopolymer having a specific gravity of from 0.91 to 0.925 g/cm$^3$, and also includes physical blends of two or more different LDPE homopolymers.

The term "polyamide" as used herein refers to polymers having amide linkages along the molecular chain, and preferably to synthetic polyamides such as nylons. The term "polyamide" further encompasses both polymers comprising repeating units derived from monomers (such as caprolactam) which polymerize to form a polyamide, as well as polymers of diamines and diacids, and copolymers of two or more amide monomers (including nylon copolymers, terpolymers, etc).

As used herein, the term "seal" refers to any seal of a first region of an outer film surface to a second region of an outer film surface, including heat seal, adhesive seal, or even corona bonding. Preferably, the seal is formed by heating one or both of the film regions to a temperature at or above its seal initiation temperatures. The sealing can be performed by any one or more of a wide variety of methods, including sealing via melt-bead sealing, thermal sealing, impulse sealing, dielectric sealing, radio frequency sealing, ultrasonic sealing, hot air sealing, hot wire sealing, infrared radiation sealing.

As used herein, the phrases "seal layer", "sealing layer", "heat seal layer", and "sealant layer", refer to an outer film layer, or layers, involved in the sealing of the film to itself, another film layer of the same or another film, and/or another article that is not a film. It should also be recognized that up to the outer 1-10 mils of a film can be involved in the sealing of the film to itself or another layer. A sealant layer sealed by heat-sealing layer comprises any thermoplastic polymer.

In some embodiments, the heat-sealing layer can comprise, for example, thermoplastic polyolefin, thermoplastic polyamide, thermoplastic polyester, and thermoplastic polyvinyl chloride.

As used herein, the term "skin layer" refers to an outer layer of a multilayer film. Such outer film layers are subject to abuse during storage and handling of the packaged products.

As used herein, the term "tie layer" refers to an internal film layer having the primary purpose of adhering two layers to one another. Tie layers can comprise any nonpolar polymer having a polar group grafted thereon, such that the polymer is capable of covalent bonding to polar polymers such as polyamide, PGA, and/or ethylene/vinyl alcohol copolymer. Tie layers can comprise at least one member selected from the group including, but not limited to, modified polyolefin, modified ethylene/vinyl acetate copolymer, and/or homogeneous ethylene/alpha-olefin copolymer. Tie layers can comprise at least one member selected from the group consisting of anhydride modified grafted linear low density polyethylene, anhydride grafted low density polyethylene, homogeneous ethylene/alpha-olefin copolymer, and/or anhydride grafted ethylene/vinyl acetate copolymer.

As used herein, the term "TOC" (total organic carbon) is the total concentration of organic carbon atoms covalently bonded in the organic molecules of a given water sample. TOC is a broadly useful measurement to monitor the quality of drinking water. While organic molecules may be present in the water, the associated packaging can also contribute to the TOC value by leaching low molecular weight compounds. Particularly, the low molecular weight compounds can include additives (such as slip agents and/or antioxidants), residual comonomer and oligomer from the polymeric film resins, and products of decomposition-associated processes such as extrusion, corona treatment, and the like. Low molecular weight compounds such as ketones or aldehydes generated at the film surface through oxidative processes are particularly known to affect the organoleptic properties of water.

All compositional percentages used herein are presented on a "by weight" basis, unless designated otherwise.

FIG. 1 illustrates a multilayer film in accordance with the first aspect of the invention as set forth above. Film 10 includes sealant layer 12, bulk layer 14, first tie layer 16, core layer 18, second tie layer 20, third tie layer 22, and odor barrier layer 24. In the embodiment illustrated in FIG. 1, each of layers 12, 14, 16, 18, 20, 22, and 24 are directly adhered to one another. However, additional layers may be utilized in film 10. Additional materials can be incorporated into one or more of the film layers as appropriate, including (but not limited to) antiblock agents, slip agents, antifog agents, and the like. Other additives can also be included in one or more film layers to impart properties desired for the particular article being manufactured, such as (but not limited to) fillers, pigments, dyes, antioxidants, stabilizers, processing aids, plasticizers, fire retardants, ultraviolet-absorbers, and the like.

Film 10 can have any total thickness desired, and each layer can have any thickness desired, so long as the film provides the desired properties for the particular packaging operation in which the film is used. In some embodiments, the total film thickness can be about 0.5 to 15 mils; in some embodiments, from about 1 to 12 mils; in some embodiments, from about 2 to 10 mils; in some embodiments, from about 3 to 8 mils; and in some embodiments, from about 4 to 6 mils. Thus, film 5 can have a thickness of at least (or no more than) 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, or 15 mils. It should also be noted that in some embodiments FIG. 1 is not drawn to scale and the layers can be of varying thicknesses compared to one another.

Although a 7-layer film is depicted in FIG. 1, the presently disclosed subject matter can include films comprising less or more than 7 layers. Particularly, in some embodiments, the disclosed film can have from 2 to 20 layers; in some embodiments, from 5 to 12 layers; and in some embodiments, from 5 to 10 layers. Thus, the disclosed film can have 2, 3, 4, 5, 6, 7, 8, 9, 10, 11, 12, 13, 14, 15, 16, 17, 18, 19, or 20 layers. One of ordinary skill in the art would also recognize that the disclosed film can comprise more than 20 layers, such as in embodiments wherein the film components comprise microlayering technology.

Film 10 can be constructed using any suitable process known to those of ordinary skill in the art, including (but not limited to) coextrusion, lamination, extrusion coating, and combinations thereof. Upward blown film production processes, downward cast film production processes, and extrusion-coating film production processes, are well known to those of skill in the art, as evidenced by the figures and description thereof in U.S. Pat. No. 7,611,770, to Kennedy et al, and U.S. Pat. No. 3,741,253 to Brax et al., and U.S. Pat. No. 8,012,520 B2, to Mudar et al, each of which is hereby incorporated, in its entirety, by reference thereto.

In a preferred embodiment (see Film No. 16, below), sealant layer 12 comprises 97 wt. % ssLLD1, which was a single site catalyzed, bimodal ethylene/octene linear low density copolymer which was commercially available as SURPASS® FPs317-A homogeneous LLDPE with density of 0.921 g/cm$^3$ and melt index of 4 g/10 min. The bimodal nature of this LLDPE is beneficial in terms of lowering melt temperature upon exit of the coextrusion die which in terms limits thermo-oxidation of the sealant surface. To further limit this thermo-oxidation process which can be a source of acetaldehyde formation, a possible cause of water tainting, the sealant layer is stabilized by the addition of an antioxidant package, i.e. AMPACET 10555 primary and secondary antioxidant in LLDPE. The presence of excess antioxidant may also be beneficial when packaging slightly ozonated water, i.e., to limit the formation of aldehydes at the sealant surface. The relatively high melt index of the bimodal ethylene/octene copolymer is believed to (i) limit melt temperature rise at increasing shear rate which is beneficial in reducing auto-oxidative process, and (ii) provide improved seal caulkability versus lower melt index resins. The slip properties of the seal layer are provided by an antiblock masterbatch, i.e., AMPACET 1000214N silica antiblock in LLDPE. It is further believed that a high molecular weight silicon-based masterbatch may improve slip properties and hot release on packaging equipment as well as on the film production line.

Figure 2:
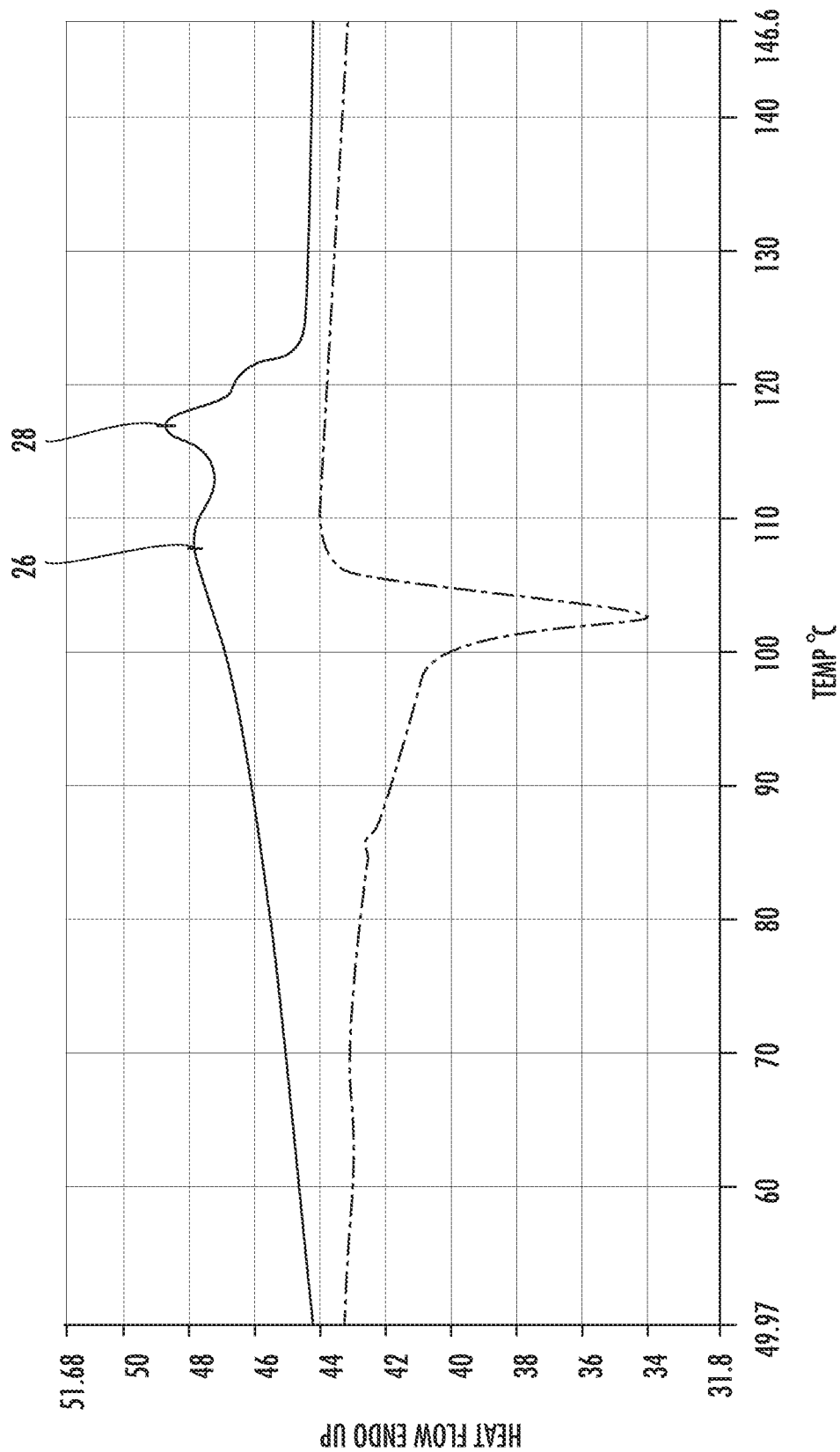
FIG. 2 is differential scanning a calorimetry curve ("DSC curve") for the bimodal ethylene/α-olefin copolymer referred to below as "ssLLD1."

As an example of the general characteristics of bimodal homogeneous ethylene/α-olefin copolymers for use in any film, process, packaging article, or packaged product, FIG. 2 is a DSC curve for the bimodal ssLLD6, i.e., the single site catalyzed, bimodal ethylene/hexene linear low density copolymer having a density of 0.920 g/cc and a melt index of 1.9 g/10 min. Resin ssLLD6 was commercially available as EVOLUE® SP2320E homogeneous linear low density ethylene/hexene copolymer. The DSC curve for ssLLD6 was generated by holding the sample for 1.0 min at 30° C.; followed by heating the sample from 30° C. to 147° C. at a rate of 10° C. per minute; followed by holding the sample at 147° C. for 1.0 min, followed by cooling the sample from 147° C. to −43° C. at 10° C. per minute; followed by holding the sample at −43° C. for one minute; followed by heating the sample from −43° C. to 147° C. at 10° C. per minute.

The bimodal composition of ssLLD1 is apparent from the upper curve in FIG. 2, which is a second heating curve, whereas the lower curve in FIG. 2 is a recrystallization curve (i.e., freezing curve) and does not reveal the bimodal composition of ssLLD1. The upper curve in FIG. 2 reveals the bimodal nature of ssLLD6 in that the upper curve has a first melt peak 26 at 107.7° C. (i.e., the first component of the ssLLD1 bimodal polymer) and a second melt peak 28 at 116.7° C. (i.e., the second component of the bimodal ssLLD1 polymer). These two peaks show the bimodal composition of ssLLD1.

Figure 3:
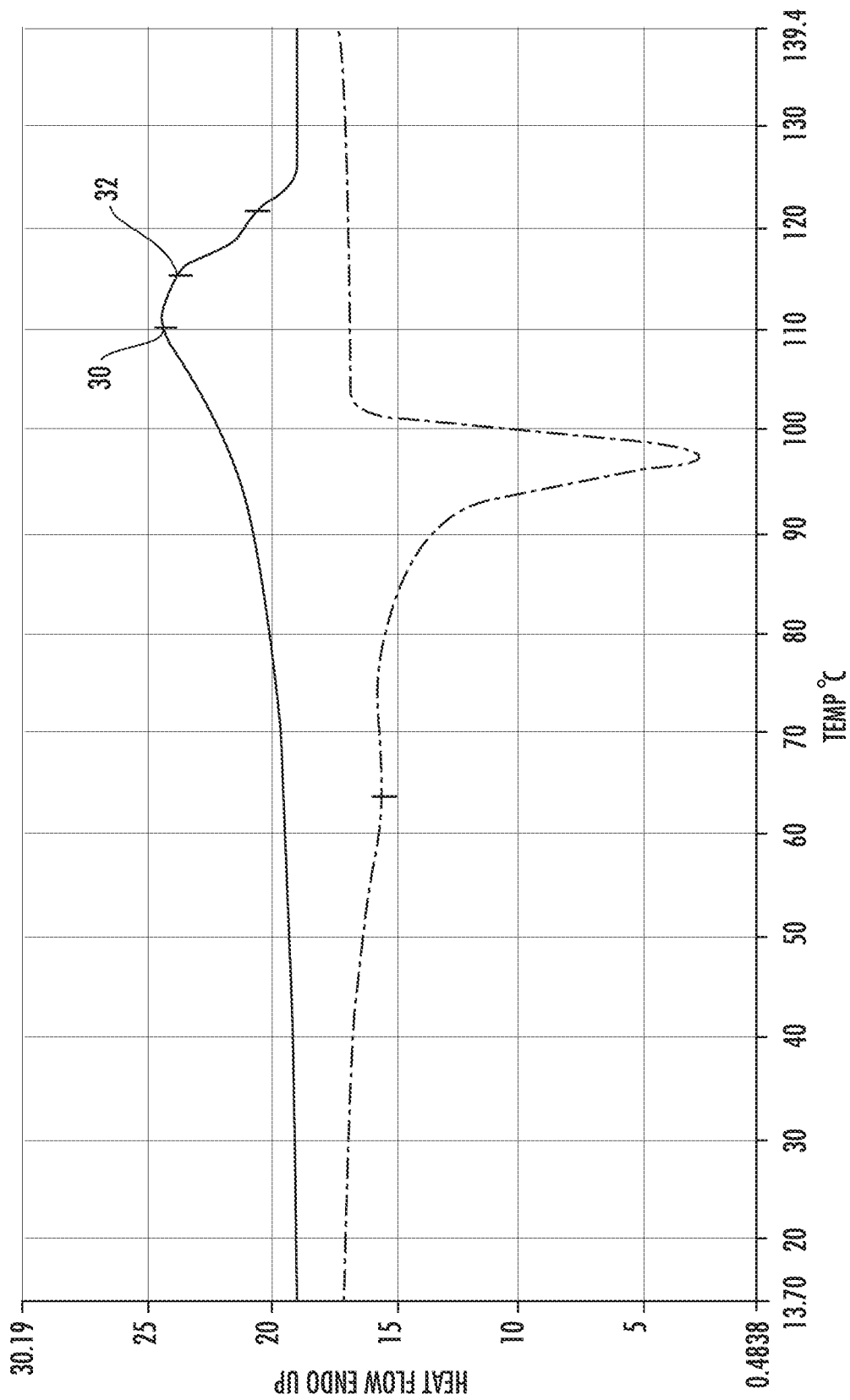
FIG. 3 is differential scanning a calorimetry curve ("DSC curve") for the bimodal ethylene/α-olefin copolymer referred to below as "ssLLD4."

FIG. 3 is a DSC curve for ssLLD4, i.e., the single site catalyzed, bimodal ethylene/octene linear low density copolymer having a density of 0.917 g/cc and a melt index of 1.0 g/10 min. The DSC curve for ssLLD4 was generated using the same equipment and same procedure as for the generation of the DSC curve for ssLLD1, i.e., as described above. Resin ssLLD4 was commercially available as SURPASS® FPs016-C homogeneous linear low density ethylene/octene copolymer.

The bimodal composition of ssLLD4 is apparent from the upper curve in FIG. 3, which is a second heating curve, whereas the lower curve in FIG. 3 is a recrystallization curve (i.e., freezing curve) and does not reveal the bimodal composition of ssLLD4. However, the upper curve in FIG. 3 reveals the bimodal nature of ssLLD6 in that the upper curve has a first melt peak 30 at 110.4° C. (i.e., the first component of the bimodal ssLLD4 polymer) and a second melt peak 32 at 115.4° C. (i.e., the second component of the bimodal ssLLD4 polymer). These two peaks show the bimodal composition of ssLLD4.

In a preferred embodiment (see Film No. 16, below), 98 wt. % of bulk layer 14 was composed of a homogeneous ethylene/hexene copolymer, i.e., EXCEED® XP 8656 ML homogeneous ethylene/hexene copolymer having a density of 0.916 g/cm$^3$ and a melt index of 0.6 g/10 min. The fractional melt index of this copolymer is believed to improve bubble stability during upward blown film manufacture, and to provide the multilayer film with improved abuse resistance, i.e., improved flex crack resistance and improved drop test results, particularly when dropping a pouch filled with water at 13° C. immediately after packaging and before the nylon contained in the core layer was fully hydrated. The alpha-olefin copolymer was present in a blend with the same antioxidant masterbatch used in the seal layer. The antioxidant is believed to limit the formation of oxidized species in the layer adjacent to the food contact layer. Bulk Layer 14 renders the multilayer film more abuse-resistant at low temperature and immediately after packing. Bulk layer 14 is one of the thickest layers of the multilayer film, i.e., about 30% of the total structure.

In a preferred embodiment (i.e., in Film No. 16, below), 100 wt. % of core layer 18 was composed of copolyamide 6/66, i.e., ULTRAMID® C33 copolyamide 6/66 having a melting point of 195-197° C. and a density of 1.12 g/cm$^3$. Core layer 18 made up 20% of the total film thickness, and provided the multilayer film with heat-resistance during forming and sealing of the film to make a form-fill-seal pouch. Core layer 18 also provided the multilayer film with enhanced piercing properties (for insertion and installation of fitment), as well as abuse-resistance. Keeping the nylon layer thin contributed to film softness (i.e. less wrinkling), and minimized adverse organoleptic effects by minimizing total organic compounds ("TOC"), as polyamide is believed to be one of the biggest contributors to extractables. Nylon copolymer in the core layer is also preferred because it should result in lower extrusion temperature and therefore higher thermal stability than PA6 (i.e., polycaprolactam, which is a homopolymer). The hydration of the polyamide 6/66 layer provided the film with high drop test performance after the film was properly aged. Although the core layer was 20% of total film thickness in preferred film No. 17, further work has demonstrated that the core layer can be thinned down to a thickness of only 14% of total film thickness, with the film manufacturing process, the packaging process, and the packaged product performance all being good.

In a preferred embodiment (i.e., in Film No. 16, below), each of the $1^{st}$ tie layer 16 and the $2^{nd}$ tie layer 20 was composed of a blend of (i) 70 wt % (based on total layer weight) PLEXAR® 3236 maleic anhydride-modified linear low density polyethylene with density 0.921 g/cc, a melt index of 2.0 g/10 minutes, and a vicat softening point 212° F., and (ii) 30 wt % (based on total layer weight) EXCEED® XP 8656 ML homogeneous linear low density ethylene/$C_6$ copolymer having a density of 0.916 g/cm$^3$ and a melt index of 0.6 g/10 min.

The $1^{st}$ tie layer 16 served to adhere the bulk layer to the core layer. The $2^{nd}$ tie layer 20 served to adhere the core layer to the $3^{rd}$ tie layer 22. The selection of PLEXAR® 3236 maleic anhydride-modified LLDPE as 70 wt % of the $1^{st}$ tie layer 16 is also believed to provide the $1^{st}$ tie layer 16 with a low total organic compound contribution (small compounds that can produce an undesirable organoleptic effect), as the PLEXAR® 3236 maleic anhydride-modified LLDPE made up the majority of the $1^{st}$ and $2^{nd}$ tie layers 16 and 20 and was produced on a clean catalyst system. Although an anhydride modified LLDPE-based tie resin with a density of 0.921 g/cc was found to perform well in the $1^{st}$ and $2^{nd}$ tie layers 16 and 20, it is believed that lower density material such as an anhydride-modified VLDPE-based tie resin could provide additional overall structure toughness. The 30 wt % non-modified, fractional melt index ethylene/hexene resin in the $1^{st}$ and $2^{nd}$ tie layers 16 and 20 is believed to improve the overall film toughness without affecting the bond strength of the tie resin to the nylon core.

In a preferred embodiment (i.e., in Film No. 16, below), $3^{rd}$ tie layer 22 was composed of a blend of (i) 68 wt % ADMER® AT2146E maleic anhydride-modified ethylene/octene tie resin copolymer having a density of 0.915 g/cm$^3$ and a melt index of 1.3 g/10 min, and (ii) 30 wt % ENABLE® 2005 HH homogeneous et/hexene copolymer having a density of 0.920 g/cc and a melt index of 0.5 g/10 min. The lower density (0.915 g/cc) and low melt index (1.3 g/10 min) of the anhydride-modified ethylene/octene tie layer resin relative to the anhydride-modified tie layer resin of the $1^{st}$ and $2^{nd}$ tie layers 16 and 20 is believed to be beneficial in terms of both film toughness and adhesion to the stiff PETG odor barrier layer as it deforms better at the interface of the $3^{rd}$ tie layer 22 and the PETG odor barrier layer 24. The toughness of the $3^{rd}$ tie layer 22 is further improved by the 30 wt % presence of the single site catalyzed ENABLE® 2005 HH homogeneous et/hexene copolymer having a density of 0.920 g/cc and a fractional melt index of 0.5 g/10 min at 190° C. Moreover, the thickness of the $3^{rd}$ tie layer 22 (15% based on total film thickness) is believed to contribute to minimizing the curl exhibited by the film. An antioxidant masterbatch was also provided in $3^{rd}$ tie layer 22 to provide further heat stabilization.

The polyester in the outer layer can be a polyethylene terephthalate homopolymer or copolymer. Whereas PET homopolymer is made by polymerizing terephthalic acid with ethylene glycol, PETG is a copolymer of terephthalic acid, ethylene glycol, and cyclohexanedimethanol (CHDM). CHDM is present in PETG at a level high enough so that PETG is amorphous. PETG is beneficial in running lower extrusion temperature relative to homopolymer PET. The lower processing temperature of PETG limits the surface oxidation of the film as it exits the die.

The polyester may be polyethylene furanoate. AVANTIUM® bio-based polyester is a polyethylene furanoate which per unit thickness exhibits only one tenth the oxygen transmission rate of polyethylene terephthalate (PET), one fourth the carbon dioxide transmission rate of PET, and one half the water vapor transmission rate of PET. Polyethylene furanoate is more heat-resistant than PET, with a glass transition temperature ($T_g$) 12° C. higher than PET, with a melt point of 165° C., which is higher than PET. Furthermore, polyethylene furanoate is recyclable alone or in a blend with PET. Polyethylene furanoate can be extruded to form films. Polyethylene furanoate is made by polymerizing ethylene glycol and 2,5-furandicarboxylic acid (FDCA). Polyethylene furanoate is renewable, as it is bio-based.

Other amorphous polymers may be used in place of amorphous PETG, such as PCTG (polycyclohexylene dimethylene terephthalate), PCTA (polycyclohexanedimethanol terephtalic acid), cyclic olefin copolymer (e.g., ethylene/norbomene copolymer), and amorphous polyamide (e.g., polyamide 6I6T). Also, PBT (i.e., polybutylene terephthalate) or copolyesters thereof (e.g., PBTG, a copolymer of terephthalic acid, butylene glycol, and cyclohexanedimethanol (CHDM)) with a level of modification resulting in melting points≤250° C., or ≤220° C., or ≤200° C., permit low extrusion temperature and provide taint barrier, as further alternatives to PETG.

In an embodiment (i.e., in Film No. 16 & Film No. 19, below), odor barrier layer 24 was composed of a blend of (i) 98 wt % EASTAR® PETG 6763 polyethylene terephthalate/glycol (i.e., PETG) having a density of 1.27 g/cc and a melt index of 2.8 g/10 min. The PETG odor barrier layer provided a barrier to odorous and aromatic compounds capable of migrating from the ambient to the inside of the packaging article. The presence of the PETG odor barrier layer was relegated to a thin skin layer due to the brittle nature of the PETG polymer which was capable of providing adequate odor/taste barrier. Maintaining the flexibility and toughness of the pouch was beneficial to performance, due to the handling conditions around the water pouch at the time of packaging and during distribution and use. Providing a relatively thin PETG odor barrier layer allowed the other film layers to bare the blunt of the deformation more easily before the skin layer was forced to contribute its abuse resistance.

PETG tends to stick to equipment. Amorphous silica and wax ester has been added to amorphous PETG to lower the coefficient of friction upon emergence from the die and in subsequent processing, to prevent blocking of the film to itself, and to improve film tracking on processing equipment at room temperature. It has also been found advantageous to add polydimethylsiloxane (PDMS) to the amorphous polyester to provide the polyester outside layer with high temperature release properties, causing the film to readily release from the heat seal bar during the heat sealing process.

Moreover, sealant layer 12 and odor barrier layer 24 are incompatible in that they do not heat seal to one another, necessitating a fin seal of the seal layer to itself in the backseam running the length of a form-fill-and-seal packaging article. Although polyethylene terephthalate ("PET")

could be used in place of PETG as the odor barrier polymer for the odor barrier layer 24, PETG was also selected over PET in part because of the stronger affinity of PETG for polyolefin, making the bond between the odor barrier layer and the 3$^{rd}$ tie layer stronger than it would have been with PET as the odor barrier polymer. This stronger bond provides greater adhesion and improved processability as PETG can be extruded at lower temperature than PET, thereby lowering the thermal oxidation of the odor barrier layer polymer, and providing the odor barrier layer with lower moisture sensitivity. A slip/antiblock masterbatch was added to the odor barrier layer for processability in extrusion and machinability on the form-fill-and-seal; machine. The slip package in AB-3 is based on ester waxes which do not appear to transfer and migrate to the sealant surface and have an adverse organoleptic effect. The slip characteristics of the skin affect the piercing performance. Film No. 16 exhibited excellent conformity to the piercing probe.

In an embodiment of the first aspect, the seal layer contains less than 10 parts per billion of total organic carbon, or less than 5 ppb, or less than 1 ppb total organic carbon, or less than 0.8 ppb, or less than 0.7 ppb, or less than 0.6 ppb.

In an embodiment of the first aspect, the seal layer further comprises antiblocking particulates and an antioxidant. In an embodiment, the antiblocking agent can be a polysiloxane.

In an embodiment of the first aspect, the seal layer is does not comprise wax.

In an embodiment of the first aspect, the seal layer has thickness of from 5% to 25%, based on total thickness of the multilayer film, and the homogeneous ethylene/alpha-olefin copolymer in the seal layer has a melt index of at least 1.0 g/10 min In an embodiment of the first aspect, the homogeneous ethylene/α-olefin copolymer in the seal layer comprises a bimodal homogeneous ethylene/α-olefin copolymer, and the bimodal homogeneous ethylene/α-olefin copolymer comprises a first homogeneous ethylene/α-olefin copolymer component and a second homogeneous ethylene/α-olefin copolymer component, wherein the first homogeneous ethylene/α-olefin copolymer component has a melting point below the melting point of the second homogeneous ethylene/α-olefin copolymer component.

In an embodiment of the first aspect, the bimodal homogeneous ethylene/α-olefin copolymer has a density of at least 0.910 g/cc, or at least 0.908 g/cm$^3$, or at least 0.91 g/cm$^3$ or at least 0.912 g/cm$^3$, or at least 0.915 g/cm$^3$.

In an embodiment of the first aspect, the bimodal homogeneous ethylene/α-olefin copolymer has a melt index of at least 3 g/10 min.

In an embodiment of the first aspect, the bimodal homogeneous ethylene/α-olefin copolymer has a melt index of from 3 to 5 g/10 min.

In an embodiment of the first aspect, the first homogeneous ethylene/α-olefin copolymer component has a melting point of at least 113° C. (or from 105° C. to 113° C., or from 108° C. to 113° C., or from 110° C. to 113° C.), and the second homogeneous ethylene/α-olefin copolymer component has a melting point of greater than 113° C. (or from >113° C. to 125° C.; or from >113° C. to 120° C.; or from >113° C. to 118° C.; or from >113.1° C. to 116° C.).

In an embodiment of the first aspect, the first homogeneous ethylene/α-olefin copolymer component has a melting point of from 108° C. to 113° C., and the second homogeneous ethylene/α-olefin copolymer component has a melting point of from >113° C. to 118° C.

In an embodiment of the first aspect, the multilayer film is coextruded.

In an embodiment of the first aspect, the bulk layer has a thickness of from 15% to 60%, based on total thickness of the multilayer film (or from 15% to 50%, based on total thickness of the multilayer film; or from 15% to 40%, based on total thickness of the multilayer film).

In an embodiment of the first aspect, the ethylene/α-olefin copolymer in the bulk layer is a single site catalyzed copolymer and has a density of from 0.90 g/cm$^3$ to 0.925 g/cm$^3$ (or at least 0.88 g/cm$^3$; or at least 0.89 g/cm$^3$; or at least 0.90 g/cm$^3$; or at least 0.91 g/cm$^3$; or at least 0.915 g/cm$^3$; or from 0.88 g/cm$^3$ to 0.93 g/cm$^3$; or from 0.89 g/cm$^3$ to 0.925 g/cm$^3$; or from 0.90 g/cm$^3$ to 0.92 g/cm$^3$; or from 0.91 g/cm$^3$ to 0.92 g/cm$^3$).

In an embodiment of the first aspect, the ethylene/α-olefin copolymer in the bulk layer has a melt index of less than 1.0 g/10 min (or from 0.2 to 0.9 g/10 min, or from 0.3 to 0.8 g/10 min, or from 0.4 to 0.6 g/10 min).

In an embodiment of the first aspect, the bulk layer further comprises an antioxidant.

In an embodiment of the first aspect, the core layer comprises polyamide.

In an embodiment of the first aspect, the core layer comprises polyamide copolymer.

In an embodiment of the first aspect, the core polyamide copolymer comprises polyamide 6/66.

In an embodiment of the first aspect, the core layer has a thickness of from 13% to 25%, based on total thickness of the multilayer film (or from 14% to 20%, based on total thickness of the multilayer film).

In an embodiment of the first aspect, the first tie layer comprises at least one member selected from the group consisting of anhydride-modified polyolefin and acid-modified polyolefin, and the second tie layer comprises at least one member selected from the group consisting of anhydride-modified polyolefin and acid-modified polyolefin. In an embodiment, the anhydride-modified polyolefin comprises a single site catalyzed anhydride-modified ethylene/α-olefin copolymer and the acid-modified polyolefin comprises a single site catalyzed acid-modified ethylene/α-olefin copolymer. In an embodiment, the anhydride-modified polyolefin comprises at least one member selected from the group consisting of anhydride-modified linear low density polyethylene, anhydride-modified very low density polyethylene, and anhydride-modified ultra low density polyethylene, and the acid-modified polyolefin comprises at least one member selected from the group consisting of acid-modified linear low density polyethylene, acid-modified very low density polyethylene, and acid-modified ultra low density polyethylene.

In an embodiment of the first aspect, the first tie layer contains less than 10 parts per billion of total organic carbon (or less than 5 ppb, or less than 1 ppb).]

In an embodiment of the first aspect, the core layer comprises polyamide and the multilayer film does not contain polyvinylidene chloride.

In an embodiment of the first aspect, the core layer comprises polyamide and the multilayer film does not contain ethylene/vinyl alcohol copolymer.

In an embodiment of the first aspect, the second tie layer has the same composition as the first tie layer.

In an embodiment of the first aspect, the modified ethylene/α-olefin copolymer in the third tie layer has a density of from 0.89 to 0.920 g/cm$^3$ (or from 0.90 to 0.919 g/cm$^3$, or from 0.905 to 0.918 g/cm$^3$, or from 0.910 to 0.917 g/cm$^3$, or from 0.914 to 0.916 g/cm$^3$), and a melt index of less than 2.0 g/10 min (or from 0.5 to 1.9 g/10 min, or from 0.9 to 1.7 g/10 min, or from 1.0 to 1.6 g/10 min, or from 1.1 to 1.5 g/10 min, or from 1.2 to 1.4 g/10 min).

In an embodiment of the first aspect, the modified ethylene/α-olefin copolymer in the third tie layer is anhydride modified and has a density of from 0.910 to 0.917 g/cm$^3$ and has a melt index of 1.0 to 1.6 g/10 min, and the third tie layer further comprises a single site catalyzed unmodified ethylene/α-olefin copolymer having a melt index of less than 1.0 g/10 min (or from 0.1 to 0.9 g/10 min, or from 0.2 to 0.8 g/10 min, or from 0.3 to 0.7 g/10 min, or from 0.4 to 0.6 g/10 min).

In an embodiment of the first aspect, the third tie layer further comprises an antioxidant.

In an embodiment of the first aspect, the PETG based layer is a skin layer. In another embodiment, the PETG-based layer can positioned inside the film itself.

In an embodiment of the first aspect, the odor barrier layer has a thickness of from 1% to 15% based on total thickness of the multilayer film (or from 2% to 10%, or from 3% to 7%).

In an embodiment of the first aspect, the odor barrier layer comprises at least one barrier polymer selected from the group consisting of PET, PETG, PCTG, PCTA, PBT, PBTG, cyclic olefin copolymer, and amorphous polyamide.

In an embodiment of the first aspect, the odor barrier layer comprises at least one barrier polymer selected from the group consisting of PETG, PCTG, PCTA, PBTG, ethylene/norbornene copolymer, polyamide 6I/6T, the odor barrier layer comprising the barrier polymer in an amount of from 90 to 100 wt %, based on layer weight.

In an embodiment of the first aspect, the odor barrier layer comprises glycol-modified polyethylene terephthalate in an amount of from 90 to 100 wt %, based on layer weight.

In an embodiment of the first aspect, the odor barrier layer further comprises at least one member selected from the group consisting of antiblock agent and slip agent.

In an embodiment of the first aspect, the slip agent is an amide wax which does not migrate to the surface of the seal layer.

In an embodiment of the first aspect, the odor barrier layer is free of wax.

In an embodiment of the first aspect, the odor barrier layer is an outer layer, i.e., a skin layer.

In an embodiment of the first aspect, the polyvinyl alcohol can be PVAL or PVOH. Polyvinylalcohol can be co-extruded or applied as a coating on the outer surface of the film.

In an embodiment of the first aspect, the cyclic olefin copolymer ("COC") has a glass transition temperature ("Tg") of at least 65° C., alternatively at least 70° C. Ethylene/norbornene copolymer is a preferred cyclic olefin copolymer.

In an embodiment of the first aspect, the multilayer film has an elongation at break of at least 200% (or at least 250%, or at least 300%, or at least 350%, or at least 400%, or at least 450%, or at least 500%, or at least 550%, or at least 600%). The elongation at break can be measured in accordance with ASTM D 882 at 23° C.

In an embodiment of the second aspect, the coextrusion is carried out in an upward blown film process.

In an embodiment of the second aspect, the coextrusion is carried out in a downward cast film process.

In an embodiment of the second aspect, the seal layer is coextruded at a temperature of from 345° F. to 395° F., or from 350° F. to 390° F., or from 350° C. to 380° F., or from 350° F. to 370° F., or from 350° F. to 360° F., or about 350° F.

In an embodiment of the second aspect, the coextrusion is carried out in a manner so as to produce a coextruded multilayer film according to any of the embodiments of the first aspect of the invention.

In an embodiment of the second aspect, the multilayer film has an elongation at break of at least 200%.

In some embodiments, the multilayer film can comprise one or more additional abuse layers. The abuse layer(s) can be any film layer, so long as the film layer serves to resist abrasion, puncture, or other potential causes of reduction of package and/or container integrity or package/container appearance quality.

In some embodiments, the multilayer film can comprise at least one additional bulk layer that functions to increase the abuse resistance, toughness, and/or modulus of the film.

In some embodiments, the disclosed film can comprise one or more barrier layers adapted for rendering the layer or the film relatively impermeable to a gas.

Various combinations of layers can be used in the formation of a film in accordance with the presently disclosed subject matter. For example, in some embodiments, the disclosed film can comprise the following combination A/B/C/D/C/B/E, where A represents a sealant layer; B represents an intermediate layer (such as the first and second intermediate layers disclosed herein), C represents a tie layer; D represents a core layer; and E represents a skin layer. One or more additional tie layers can optionally be used between any one or more layers of the above multilayer film structures. Further, one or more abuse, barrier, and/or bulk layers can be used in between any one or more layers of the above multilayer film structures, as would be known to those of ordinary skill in the art.

The multilayer film can be used to construct a wide variety of packages, including (but not limited to) pouches suitable for transporting and dispensing filtered water (reverse osmosis) or ozonated water. Any of the wide variety of pouches known and used in the art can be constructed, including (but not limited to) lay flat pouches, stand-up pouches, side seal pouches, and the like. Any size pouch can be constructed, such as (but not limited to) 5-10 liter pouches.

In some embodiments, the pouches can be placed in a dispensing unit where the pouches are perforated by a spigot for water delivery. In some embodiments, the spigot can cooperate with a fitment on the pouch. Suitable fitments are not limited and can be any fitment known or used in the packaging art.

Figure 4:
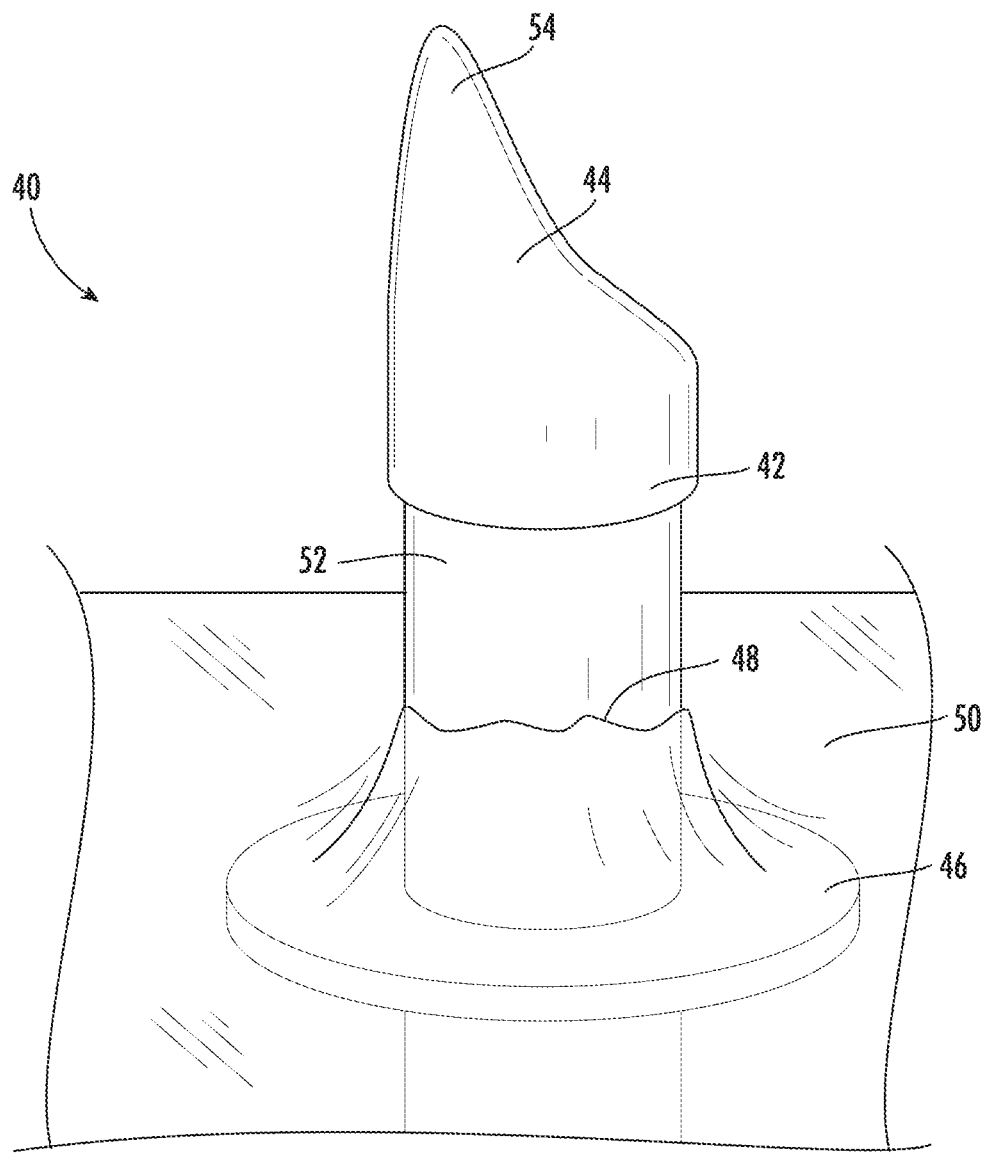
FIG. 4 is an enlarged perspective view of a portion of a pouch having a fitment-with-probe after having pierced through the film and into the inside of the pouch.

FIG. 4 illustrates a fitment-with probe-pierced-through-film 40, with fitment 42 having piercing probe 44 with a puncturing tip 54 and flange 46. A portion 48 of film 50 was stretched up along a portion of probe shaft 52 of fitment 42. In FIG. 4, the film conformed well around the probe. Excessive force was not required to force the probe to perforate the film.

Packaging articles made from the multilayer film can be used for a variety of purposes, including storing, transporting, and dispensing water.

In some embodiments, the multilayer film comprises little or no extractables. As a result, the packaging material does not adversely affect the organoleptic properties of the product inside the package.

Pouches constructed from the disclosed films have a very low TOC value. In some embodiments, the TOC value attributed to the pouch is less than 10 ppb (for 5×5 inch pouches filled with deionized water aged 48 hours at 40° C., followed by aging 24 hours at room temperature and then measurement using a Sievers M5310 C TOC analyzer, available from GE Analytical Instruments). The disclosed film structures exhibit lower TOC values compared to traditional polyethylene-based structures currently used in the market today.

EXAMPLES

The following Examples provide illustrative embodiments. Table 1 is a table of the various resins and other components used to make the multilayer films 1-17 disclosed in Tables 2-17. Table 18 is a comparative film in commercial use today, with generic identity of resins in each layer known, but with name brand identity of resins in each layer unknown. Tables 2-17 provide the layer arrangement, layer function, layer thickness, and layer composition, for multilayer films.

TABLE 1

Resin Identification

| Mat'l Code | Trade Name or Designation | Generic Description | Source |
|---|---|---|---|
| ELAS-1 | AFFINITY ® EG 8100G | Very low density polyethylene elastomer, 0.870 g/cc (ASTM D792), 1.0 g/10 min (ASTM 1238); Vicat softening temp 113° F. (ASTM D1525) | The Dow Chemical Co., Midland, MI |
| ELAS-2 | ENGAGE ® 8100 | polyolefin elastomer: 0.870 g/cc (ASTM D792), 1.0 g/10 minutes (ASTM D1238), and Vicat Softening Temperature of 113° F. (ASTM D1525) | The Dow Chemical Co., Midland, MI |
| PE | ESCORENE ® LD200.48 | polyethylene homopolymer with density 0.923 g/cc | ExxonMobil, Fairfax, VA |
| MDPE | DOWLEX ® 2037 | Medium density et/$C_8$ copolymer, heterogeneous; 0.935 g/cc; 2.5 g/10 min | Dow |
| LDPE-1 | PETROTHENE NA345013 | Low density polyethylene homopolymer, 0.921 g/cc; 1.8 g/10 min | LyondellBasell Industries |
| LDPE-2 | LDPE 132I | Low density polyethylene homopolymer, 0.921 g/cc; 0.25 g/10 min | Dow |
| zLLD | DOWLEX ® 2045.03 | Heterogeneous linear low density et/$C_8$ copolymer; 0.92 g/cc; 1.10 g/10 min | Dow |
| ssLLD1 | SURPASS ® FPs317-A | Homogeneous linear low density et/$C_8$ copolymer; 0.917 g/cc; 4 g/10 min; bimodal | Nova Chemicals |
| ssLLD2 | EXCEED ® XP 8656 ML | homogeneous linear low density et/$C_6$ copolymer; 0.916 g/cc; 0.6 g/10 min | ExxonMobil |
| ssLLD3 | ENABLE ® 2005 HH | homogeneous linear low density et/$C_6$ copolymer; 0.920 g/cc; 0.5 g/10 min | ExxonMobil |
| ssLLD4 | SURPASS ® FPs117-C | Homogeneous linear low density et/$C_8$ copolymer; 0.917 g/cc; 1.0 g/10 min; bimodal | Nova Chemicals |
| ssLLD5 | SURPASS ® FPs016-C | Homogeneous linear low density et/$C_8$ copolymer; 0.917 g/cc; 0.65 g/10 min | Nova Chemicals |
| ssLLD6 | EVOLUE ® SP2320E | homogeneous linear low density et/$C_6$ copolymer; 0.920 g/cc; 1.9 g/10 min; bimodal | Prime Polymer Co. Ltd |
| ssVLD | AFFINITY ® 1281g1 | homogeneous very low density et/$C_8$ copolymer; 0.900 g/cc; 6.0 g/10 min | Dow |
| PETG | EASTAR ® PETG 6763 | Polyethylene Terephthalate/Glycol: 1.27 g/cc; 2.8 g/10 min (an amorphous PETG) | Eastman Chemical |
| PET | GRILTEX ® ES702 | Polyethylene Terephthalate, 1.27 g/cc; 125° C. melt point | EMS-Grivory |
| coPET | EASTAPAK ® COPOLYEST ER9921 | Polyethylene Terephthalate, 1.40 g/cc; 255° C. melt point | Eastman Chemical |
| E-P Cop | LX5 02-15 | isotatic ethylene/propylene copolymer | Total Petrochemicals, Houston, TX. |

TABLE 1-continued

Resin Identification

| Mat'l Code | Trade Name or Designation | Generic Description | Source |
|---|---|---|---|
| PA-1 | ULTRAMID® C33 | copolyamide 6/66: relative viscosity 3.19-3.41 (ISO 307), m.p. 195-197° C. (ISO 3146), and density 1.12 g/cc (ISO 1183). | BASF Corporation, Florham Park, N.J. |
| PA-2 | ULTRAMID® C40 L | copolyamide 6/66 with density of 1.12 g/cc (ISO 1183) and melting point of 192-194° C. (ISO 3146). | BASF Corp., Florham Park, N.J. |
| PA-6 | ULTRAMID® B40 | Polyamide 6; 1.13 g/cc | BASF |
| aPA | GRIVORY® G21 Natural | Amorphous polyamide, 1.18 g/cc; 36 g/10 min | EMS-Grivory |
| ENB | 8007F-400 | ethylene/norbornene copolymer; 1.02 g/cc; 2.04 g/10 min | Topas Advanced Polymers, Inc |
| mLLD-1 | PLEXAR® 3236 | maleic anhydride-modified linear low density polyethylene with density 0.921 g/cc (ASTM D1505), melt flow 2.0 g/10 minutes (ASTM 1238), and vicat softening point 212° F. (ASTM D882). | LyondellBasell Ind., Rotterdam, NL |
| mLLD-2 | MODIC® APM533 | maleic acid-modified linear low density polyolefin with melting point of 123° C. (ASTM D1525) | Mitsui Petrochemical Corp., N.Y., N.Y. |
| mPOcop | ADMER® AT2146E | maleic anhydride-modified ethylene/octene copolymer; 0.915 g/cc; 1.3 g/10 min | Mitsui Petrochemical Corp., N.Y., N.Y. |
| mVLD | ADMER® AT2754A | maleic anhydride-modified very low density polyethylene; 0.900 g/cc; 2.7 g/10 min | Mitsui |
| mSEBS | FG1901 GT | maleic anhydride-modified styrene/ethylene/butene/styrene triblock copolymer; 0.91 g/cc; 22 g/10 min | Kraton Polymers |
| AOX | 10555 | primary and secondary antioxidant in LLDPE, 0.9320 g/cc; 2.5 g/10 min | Ampacet |
| PDMS-1 | MB50-001 | Polydimethylsiloxane in polypropylene - high molecular weight siloxane, 0.95 g/cc; 12 g/10 min | Dow Corning |
| PDMS-2 | MB50-802 | Polydimethylsiloxane in low density polyethylene - high molecular weight siloxane, 1.03 g/cc; 8.0 g/10 min | Dow Corning |
| AB-1 | POLYBATCH® ABPP10 | 10% synthetic silica antiblock in propylene homopolymer, specific gravity 1.0 (DIN 53479), 31.2-37.5 lb/ft$^3$ (DIN 53466), 5.0 g/10 min (DIN 53735) | Schulman, Inc., Akron, Ohio |
| AB-2 | AMPACET® 1000214N | silica antiblock in linear low density polyethylene. | Ampacet, Tarrytown, N.Y. |
| AB-3 | SUKANO G Dc S503 | antiblock and slip in polyethylene terephthalate/glycol - amorphous silica and ester wax | Sukano Duncan, S.C. |
| AB-4 | 1070SB | antiblock and slip (diatomaceous earth and erucamide) in linear low density polyethylene; 0.98 g/cc; 5.5 g/10 min | Ingenia Polymers |
| AB-5 | 102076 | silica antiblock in linear low density polyethylene - amorphous silica | Ampacet, Tarrytown, N.Y. |
| AB-6 | G DC S587-ELV | Amorphous Silica and Ester PETG wax (slip and antiblock) | Sukano Duncan, S.C. |
| WAX | AMPACET® 10433 | linear low density polyethylene masterbatch containing 10% ethylene-bis-stearamide wax | Ampacet, Tarrytown, N.Y. |

TABLE 2

| Layer function | Film No. 1 (comparative) | | | | | | |
|---|---|---|---|---|---|---|---|
| | Seal | 1st Bulk | 1st Tie | Barrier | 2nd Tie | 2nd Bulk | Skin |
| compos. | 92% E-P Cop 5% AB-1 2% PDMS-1 1% Wax | 70% ELAS-1 30% PE | 100% mLLD-1 | 100% PA-1 | 100% mLLD-1 | 70% ELAS-1 30% PE | 92% E-P Cop 5% AB-1 2% WAX 1% PDMS-1 |
| Vol. % | 10 | 24 | 9 | 14 | 9 | 24 | 10 |
| Thickness | 0.5 mil | 1.20 mils | 0.45 mil | 0.70 mil | 0.45 mil | 1.20 mils | 0.5 mil |

TABLE 3

| Layer function | Film No. 1 (comparative) | | | | | | |
|---|---|---|---|---|---|---|---|
| | Seal | 1st Bulk | 1st Tie | Barrier | 2nd Tie | 2nd Bulk | Skin |
| compos. | 92% E-P Cop 5% AB-1 2% PDMS-1 1% Wax | 70% ELAS-1 30% PE | 100% mLLD-1 | 100% PA-1 | 100% mLLD-1 | 70% ELAS-1 30% PE | 92% E-P Cop 5% AB-1 2% WAX 1% PDMS-1 |
| Vol. % | 10 | 24 | 9 | 14 | 9 | 24 | 10 |
| Thickness | 0.5 mil | 1.20 mils | 0.45 mil | 0.70 mil | 0.45 mil | 1.20 mils | 0.5 mil |

TABLE 4

| Layer function | Film No. 3 (comparative) | | | | | | |
|---|---|---|---|---|---|---|---|
| | Seal | 1st Bulk | 1st Tie | Barrier | 2nd Tie | 2nd Bulk | Skin |
| compos. | 92% E-P Cop 5% ELAS-2 2% PDMS-1 1% Wax | 100% ELAS-2 | 100% mLLD-2 | 100% PA-2 | 100% mLLD-2 | 100% ELAS-2 | 92% E-P Cop 5% ELAS-2 2% PDMS-1 1% Wax |
| Vol. % | 10 | 24 | 9 | 14 | 9 | 24 | 10 |
| Thickness | 0.5 mil | 1.20 mils | 0.45 mil | 0.70 mil | 0.45 mil | 1.20 mils | 0.5 mil |

TABLE 5

| Layer function | Film No. 4 (comparative) | | | | | | |
|---|---|---|---|---|---|---|---|
| | Seal | 1st Bulk | 1st Tie | Barrier | 2nd Tie | 2nd Bulk | Skin |
| compos. | 72% E-P Cop 20% ELAS-2 5% AB-1 2% PDMS-1 1% Wax | 100% ELAS-2 | 100% mLLD-2 | 100% PA-2 | 100% mLLD-2 | 100% ELAS-2 | 72% E-P Cop 20% ELAS-2 5% AB-1 2% Wax 1% PDMS-1 |
| Vol. % | 10 | 24 | 9 | 14 | 9 | 24 | 10 |
| Thickness | 0.5 mil | 1.20 mils | 0.45 mil | 0.70 mil | 0.45 mil | 1.20 mils | 0.5 mil |

TABLE 6

| Layer function | Film No. 5 (for lamination to PET film; for overbagging with, e.g., Film No. 13) | | | | | | |
|---|---|---|---|---|---|---|---|
| | Seal | 1st Bulk | 1st Tie | Barrier | 2nd Tie | 2nd Bulk | Skin |
| compos. | 97% ssLLD1 2% AOX | 88% ssLLD4 10% | 100% mLLD-1 | 100% PA-1 | 100% mLLD-1 | 88% ssLLD4 10% | 95% ssLLD1 1.5% AB-2 2% AOX |

TABLE 6-continued

| Layer | Film No. 5 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
|  | 1% AB-2 | LDPE<br>2% AOX |  |  |  | LDPE<br>2% AOX | 1.5%<br>PDMS-2 |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 7

| Layer | Film No. 6 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 87.5%<br>ssLLD6<br>10% ENB<br>1.5%<br>AOX<br>1% AB-5 | 88%<br>ssLLD4<br>10%<br>LDPE<br>2% AOX | 100%<br>mLLD-1 | 90%<br>PA-6<br>10%<br>aPA | 100%<br>mLLD-1 | 68%<br>ssLLD4<br>30%<br>ssLLD3<br>2% AOX | 92% ssLLD6<br>5% AB-5<br>1.5% AOX<br>1.5%<br>PDMS-2 |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 8

| Layer | Film No. 7 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 97%<br>ssLLD1<br>2% AOX<br>1% AB-2 | 68%<br>ssLLD5<br>30%<br>ssLLD3<br>2% AOX | 100%<br>mLLD-1 | 100%<br>PA-1 | 100%<br>mLLD-1 | 68%<br>ssLLD5<br>30%<br>ssLLD3<br>2% AOX | 96.5%<br>MDPE<br>1.5% AB-2<br>2% AOX |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 9

| Layer | Film No. 8 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 97% ssLLD1<br>2% AOX<br>1% AB-2 | 68% ssLLD4<br>30% LDPE-2<br>2% AOX | 100%<br>mLLD-1 | 100%<br>PA-1 | 100%<br>mLLD-1 | 68% ssLLD4<br>30% LDPE-2<br>2% AOX | 65% ssLLD1<br>30% LDPE-2<br>1.5% AB-2<br>1.5% PDMS-2<br>2% AOX |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 10

| Layer | Film No. 9 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 97% ssLLD1<br>2% AOX<br>1% AB-2 | 68% ssLLD4<br>30% ssLLD3<br>2% AOX | 100%<br>mLLD-1 | 100%<br>PA-1 | 100%<br>mLLD-1 | 68% ssLLD4<br>30% ssLLD3<br>2% AOX | 65% ssLLD1<br>30% ssLLD3<br>1.5% AB-2<br>1.5% PDMS-2<br>2% AOX |

TABLE 10-continued

| Layer | Film No. 9 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 11

| Layer | Film No. 10 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 67% ssLLD1 30% ssLLD3 2% AOX 1% AB-2 | 68% ssLLD4 30% ssLLD3 2% AOX | 100% mLLD-1 | 100% PA-1 | 100% mLLD-1 | 68% ssLLD4 30% ssLLD3 2% AOX | 65% ssLLD1 30% ssLLD3 1.5% AB-2 2% AOX 1.5% PDMS-2 |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 12

| Layer | Film No. 11 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 97% ssLLD1 2% AOX 1% AB-2 | 68% ssLLD4 30% ssLLD3 2% AOX | 100% mLLD-1 | 100% PA-1 | 100% mLLD-1 | 68% ssLLD4 30% ssLLD3 2% AOX | 65% ssLLD1 30% ssLLD2 1.5% AB-2 2% AOX 1.5% PDMS-2 |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 13A

| Layer | Film No. 12 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 97% ssLLD1 2% AOX 1% AB-2 | 98% ssLLD2 2% AOX | 100% mLLD-1 | 100% PA-1 | 100% mLLD-1 | 98% ssLLD2 2% AOX | 65% ssLLD1 30% ssLLD2 1.5% AB-2 2% AOX 1.5% PDMS-2 |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 13B

| Layer | Film No. 13 (Film converted to bag that is used to package water-filled pouch made from Film No. 12) | | | | | | |
|---|---|---|---|---|---|---|---|
| function | Seal | 1st Bulk | 1st Tie | Barrier | 2nd Tie | 2nd Bulk | Skin |
| compos. | 82% ssVLD 15% zLLD 3% AB-4 | 100% mVLD | 90% PA-6 10% aPA | 100% EVOH | 90% PA-6 10% aPA | 65% mVLD 30% mSEBS 5% PET | 100% coPET |
| Vol. % | 24.8 | 24.8 | 5 | 5 | 5 | 5.4 | 30 |
| Thickness | 0.39 mils | 0.39 mils | 0.08 mil | 0.08 mil | 0.08 mil | 0.08 mil | 0.47 mil |

TABLE 14

| Layer | Film No. 14 (for lamination to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 96.5% ssLLD1 1% AB-2 2% AOX 0.5% PDMS-2 | 68% ssLLD5 30% ssLLD3 2% AOX | 100% mLLD-1 | 100% PA-1 | 100% mLLD-1 | 68% ssLLD5 30% ssLLD3 2% AOX | 95% ssLLD1 1.5% AB-2 1.5% PDMS-2 2% AOX |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 15

| Layer | Film No. 15 (laminated to PET film; for overbagging with, e.g., Film No. 13) | | | | | | |
|---|---|---|---|---|---|---|---|
| function | Seal | 1st Bulk | 1st Tie | Barrier | 2nd Tie | 2nd Bulk | Skin |
| compos. | 97% ssLLD1 1% AB-2 2% AOX | 68% ssLLD5 30% ssLLD3 2% AOX | 100% mLLD-1 | 100% PA-1 | 100% mLLD-1 | 98% ssLLD2 2% AOX | 96.5% MDPE 1.5% AB-2 1.5% 2% AOX |
| Vol. % | 15 | 31 | 7 | 20 | 7 | 15 | 5 |
| Thickness | 0.68 mil | 1.40 mil | 0.32 mil | 0.90 mil | 0.32 mil | 0.68 mil | 0.23 mil |

TABLE 16

| Layer | Film No. 16 (Working) | | | | | | |
|---|---|---|---|---|---|---|---|
| function | Seal | Bulk | 1st Tie | Barrier | 2nd Tie | 3rd Tie | Skin |
| compos. | 97% ssLLD1 2% AOX 1% AB-2 | 98% ssLLD2 2% AOX | 70% mLLD-1 30% ssLLD2 | 100% PA-1 | 70% mLLD-1 30% ssLLD2 | 68% mPOcop 30% ssLLD3 2% AOX | 98% PETG 2% AB-3 |
| Vol. % | 15 | 31 | 7 | 20 | 7 | 15 | 5 |
| Thickness | 0.68 mil | 1.40 mils | 0.32 mil | 0.90 mil | 0.32 mil | 0.68 mil | 0.23 mil |

TABLE 17

| Layer | Film No. 17 (for overbagging with, e.g., Film No. 13; could also use MXD6/MXDI or any mat'l with Tg > service temperature, i.e., up to 50° C. or high crystalline material) | | | | | | |
|---|---|---|---|---|---|---|---|
| function | Seal | 1st Bulk | 1st Tie | Barrier | 2nd Tie | 2nd Bulk | Skin |
| compos. | 97% ssLLD1 2% AOX 1% AB-2 | 68% ssLLD5 30% ssLLD3 2% AOX | 100% mLLD-1 | 100% PA-1 | 100% mLLD-1 | 98% ssLLD2 2% AOX | 96.5% MDPE 1.5% AB-2 1.5% 2% AOX |
| Vol. % | 10 | 20 | 10 | 20 | 10 | 20 | 10 |
| Thickness | 0.45 mil | 0.90 mil | 0.45 mil | 0.90 mil | 0.45 mil | 0.90 mil | 0.45 mil |

TABLE 18

| | Film No. 18 (comparative: Mitsubishi XF735 film) | | | | |
|---|---|---|---|---|---|
| | 1st layer | 2nd layer | 3rd layer | 4th layer | 5th layer |
| compos. | PE mp 108-119° C. | PE Same as 4th layer | polyamide 6 | PE Same as 2nd layer | PE not like 1st layer |
| Vol. % | 40.1 | 8.2 | 21.8 | 10.1 | 19.8 |
| Thickness | 1.77 mil | 0.41 mil | 0.97 mil | 0.40 mil | 0.99 mil |

TABLE 19

| Layer | Film No. 19 (Working) | | | | | | |
|---|---|---|---|---|---|---|---|
| function | Seal | Bulk | 1st Tie | Barrier | 2nd Tie | 3rd Tie | Skin |
| compos. | 97% ssLLD1 2% AOX 1% AB-2 | 99% ssLLD2 2% AOX | 70% mLLD-1 30% ssLLD2 | PA-1 | 70% mLLD-1 30% ssLLD2 | 98% mPOcop 2% AOX | 96% PETG 3% AB-6 1% PDMS-2 |
| Vol. % | 15 | 28 | 7 | 20 | 7 | 15 | 8 |
| Thickness | 0.68 mil | 1.26 mils | 0.32 mil | 0.90 mil | 0.32 mil | 0.68 mil | 0.36 mil |

Film Nos. 1-4 were manufactured by cast coextrusion. This method is well known to those of ordinary skill in the art. Film Nos. 1-4, as disclosed in Tables 2-5 are provided as comparative examples. When converted into packaging articles and used to package water, with the packages being placed in cardboard boxes, they generated an organoleptic effect upon the water which was rated as "moderately disliked" (7 on a 1-9 scale, with 9 being "dislike extremely" and 1 being "like extremely") in a forced aging study. In contrast, Film No. 16, disclosed in Table 16, exhibited a rating of "like moderately" (rating of 3 on the same 1 to 9 scale) in the forced aging study.

Film No. 16 was fully coextruded on a blown film line using a 1.65:1 blow up ratio (i.e., ratio of the diameter of the die {the smaller number} to the diameter of the blown bubble {the larger number}). An equivalent structure could have been produced using various cast processes, i.e., flat cast, downward cast, downward blown, etc.

An alternative to full coextrusion is the separately produced and lamination process including the production of, for example, a seal/1st bulk/1st tie/core/2nd tie/2nd bulk/skin multilayer coextruded film where both the seal layer and the skin layer would be based on polyolefinic resin, followed by laminating this polyolefin-based multilayer film to a monolayer or multilayer film containing an odor barrier layer, e.g., a biaxially oriented PET film. The lamination could be carried out by any conventional lamination process including adhesive lamination, heat lamination, etc. Of course, the lamination approach requires more processing steps than a full coextrusion approach.

Film No. 16 was converted into packaging articles on a vertical form fill seal system equipped with a fin seal collar to produce flexible pouches with a longitudinal fin seal and two transverse end seals. The resulting packaging articles were used to package water. The sealant layer in contact with the water contained very low levels of low molecular weight compounds to prevent taint the water by the film itself. In addition, the odor barrier layer constituted a functional barrier to prevent tainting caused external factors such as taste contamination in the presence of wet cardboards.

Form-fill-seal pouches made from Film No. 16 could be used in water packaging, with the pouches placed in a dispensing unit where they are perforated by a spigot for water delivery. The spigot can be used in combination with a fitment, but not necessarily. The capacity of the pouches would typically be in the range of from 5 to 10 liters.

Vertical form-fill-seal packaging can be carried out with the equipment and processes known to those of skill in the art, including, for example, the equipment and processes disclosed in U.S. Pat. Nos. 2,956,383, 3,045,404, and 4,589,247, all of which are hereby incorporated, in their respective entireties, by reference thereto.

Drop Testing

Pouches were constructed on an ONPACK 2002 vertical form-fill-seal machine using a 630 mm tooling and a seal bar composed of 5 ribs to produce the leading and trailing end seals. The leading end seal corresponded to the pouch bottom as it leaves the ONPACK machine while the trailing end seal corresponds to the pouch top. The trailing end seal of pouch "n" was made at the same time that the leading end seal of pouch "n+1". These 2 end seals were separated on the form-fill-seal machine using the cutting knife.

The pouch dimensions were 410 mm×300 mm (in lay-flat configuration, including seals) and had a targeted volume of 6 liters, corresponding to a weight of 13.3 pounds. The pouches were filled with water with temperature of 13° C. or 25° C. A total of 40 pouches were produced for each treatment. 20 Pouches were dropped from a height of 60 cm within 10 minutes of production, 20 pouches were dropped from a height of 80 cm after 24 hours of aging at room temperature using a free-fall drop tester. Also, drop testing was performed at heights up to 100 cm, in order to differentiate the performance of various structures.

Testing was carried out in accordance with ASTM D5276. Each pouch rested on the platen of the free-fall drop tester with the pouch lap seal facing either up or down, as indicated in the Tables 18-20, below. The same pouch was dropped repeatedly until failure occurred up to a maximum of 20 drops. The drop number at which failure occurred was recorded for each pouch and the results of the 20 pouches were averaged for each treatment.

Filled pouches should achieve a minimum level of abuse performance at the time of production to pass the abuse associated with conveying from the packaging machine to the boxing station, at which location the filled pouches are dropped into a box and stacked on top of each other. Filled pouches need to be able to withstand a minimum of 3 consecutive drops from a height of 60 cm with water at a temperature of 13° C., with the dropping being carried out immediately after filling the pouches with water, i.e., with no hydration period After a 24 hour aging period, the moisture content of the polyamide layer is about 9.5 wt %. The film needs to be abuse-resistant immediately after packaging so that the water pouches can survive the first hours of handling until hydration of the film takes place.

Tables 20, 21, and 22 provide various drop test results for various films disclosed herein. The results indicate a significant improvement in the number of failures when the pouches are allowed to age for 24 hours. The improvement is believed to be associated with the absorption of moisture by the polyamide film layer, which depresses the glass transition temperature of the polyamide below the service temperature at which the film is tested. As a result, the pouches deform in ductile manner rather than breaking in a brittle manner when dropped.

TABLE 20

| | Fresh; fin up; 13° C.; 60 cm drop | Fresh; fin down; 13° C.; 60 cm drop | Fresh; fin up; 13° C.; 80 cm drop | Fresh; fin up; 13° C.; 100 cm drop | Fresh; fin up; 24.2° C.; 100 cm drop | Fresh; fin down; 13° C.; 100 cm drop | Aged; fin up; 13° C.; 100 cm drop | Aged; fin down; 13° C.; 100 cm drop |
|---|---|---|---|---|---|---|---|---|
| Film No. 6 | | | | | | | | |
| Film No. 5 | 18.9 | | 9.0 | 2.0 | | | 20.0 | |
| Film No. 4 | 20.0 | | 17.1 | 7.3 | | | 20.0 | |
| Amcor Film | 20.0 | | 17.1 | 8.3 | | 13.6 | 20.0 | |

TABLE 21

| | Fresh; fin up; 13° C.; 60 cm drop | Fresh; fin down; 13° C.; 60 cm drop | Fresh; fin up; 22.4° C.; 60 cm drop | Fresh; fin up; 13° C.; 100 cm drop | Fresh; fin up; 24.2° C.; 100 cm drop | Fresh; fin down; 22.4° C.; 100 cm drop | Fresh; fin down; 13° C.; 100 cm drop | Aged; fin up; 13° C.; 100 cm drop | Aged; fin down; 13° C.; 100 cm drop |
|---|---|---|---|---|---|---|---|---|---|
| Film No. 10 | 3.8 | 20.0 | | | | | 16.9 | 15.1 | 20.0 |
| Film No. 12 | 15.9 | | | 9.7 | | | 16.0 | 20.0 | 20.0 |
| Film No. 15 | 5.5 | 19.1 | | 2.4 | 9.6 | | 6.6 | 20.0 | 20.0 |
| Film No. 11 | 7.2 | | | 2.4 | | 13.6 | 20.0 | | |
| Film No. 11 retest | | | | 4.2 | | | 11.0 | | |
| Film No. 5 | 9.2 | 15.7 | | | | | 2.1 | 20.0 | |
| Film No. 16 | | | 15.1 | 11.6 | | | 17.4 | 20.0 | |
| Film No. 14 | | | | 20.0 | | | | | |
| Film No. 17 | 16.2 | 19.6 | | 7.67 | | | 9.3 | | |

TABLE 22

| | Fresh; 13° C.; fin seal up; 100 cm drop | Fresh; 13° C.; fin seal down; 100 cm drop | Fresh; 13° C.; fin seal up; 60 cm drop | Aged; 13° C.; fin seal down; 100 cm drop |
|---|---|---|---|---|
| Film No. 4 | 14.17 | 16.0 | 20.0 | 14.20 |
| Film No. 12 | 18.27 | 20.0 | 20.0 | 20.0 |
| Film No. 14 | 10.53 | 9.93 | 20.0 | 20.0 |

Forced Aging Study in Absence of External Contamination

Water-filled pouches were prepared on an ONPACK 2002 as described above for the drop testing, except that the pouches were 330 mm×330 mm (in lay-flat configuration, not including seals) in size when in lay-flat configuration. Samples aged at conditions A and B were: (i) stored for 11 days at 110° F., then (ii) allowed to cool down to 73° F. for an additional 20 days at the conclusion of which taste testing was conducted. Samples aged at condition C were aged for 21 days at 110° F., and then allowed to cool overnight before taste testing was conducted by a taste test panel of 3 testers or 4 testers, depending upon the test day.
The samples were rated as follows:

| 1 | 2 | 3 | 4 | 5 | 6 | 7 | 8 | 9 |
|---|---|---|---|---|---|---|---|---|
| Like Extremely | Like Very Much | Like Moderately | Like Slightly | Neither Like nor Dislike | Dislike Slightly | Dislike Moderately | Dislike Very Much | Dislike Extremely |

TABLE 23

Aging in Absence of External Contamination

| Rating Conditions | Film Code | Gauge (mils) | Rank | Average Rating |
|---|---|---|---|---|
| B | Film No. 11 | 4.5 | 1 | 1.33 |
| B | Film No. 5 | 4.5 | 2 | 1.67 |
| B | Film No. 7 | 4.5 | 2 | 1.67 |
| B | Film No. 12 | 4.5 | 2 | 1.67 |
| B | Film No. 17 | 4.5 | 2 | 1.67 |
| B | Film No. 15 | 4.5 | 11 | 2.33 |
| B | Film No. 14 | 4.5 | 2 | 1.67 |
| A | Film No. 18 (XF735) | 4.5 | 1 | 1.33 |
| A | Film No. 9 | 4.5 | 11 | 2.33 |
| A | Film No. 10 | 4.5 | 1 | 1.33 |
| A | Film No. 8 | 4.5 | 2 | 1.67 |
| A | Film No. 16 | 4.5 | 2 | 1.67 |

Forced Again Study in Presence of Wet Cardboard

Samples were prepared by making a single form-fill-seal pouch from each of from three films, with the control being un-aged water. All water was DEER PARK brand bottled water. The pouches were 13"×13" and each contained 6 liters of water, and each sample was placed in a foil liner with a piece of cardboard (540 mm×260 mm×7 mm thick) wetted with 50 ml water. Each pouch was aged in the pouch with the wet cardboard for 8 days at 110° F., following which the water-filled pouches were removed from the foil liners, allowed to cool to room temperature and remain at room temperature for 7 days until testing. Four taste test panelists rated the samples on the same 1-9 scale provided above, with the results averaged and provided below in Table 24.

TABLE 24

| | 1 Like Extremely | 2 Like Very Much | 3 Like Moderately | 4 Like Slightly | 5 Neither Like nor Dislike | 6 Dislike Slightly | 7 Dislike Moderately | 8 Dislike Very Much | 9 Dislike Extremely |
|---|---|---|---|---|---|---|---|---|---|
| Film No. 12 | | | | | | | 7.0 | | |
| Film No. 16 | | | 3.4 | | | | | | |
| FX735 | | | | | | | 7.8 | | |
| Control | | 2.4 | | | | | | | |

What is claimed is:

1. A multilayer film for use in packaging organoleptic sensitive products, comprising:

A) an outer sealant layer comprising homogeneous ethylene/α-olefin copolymer having a density of at least 0.906 cm³;

B) a first bulk layer comprising an ethylene/α-olefin copolymer having a density of from 0.89 to 0.93 g/cm³, wherein the ethylene/α-olefin copolymer in the first bulk layer is a single site catalyzed copolymer having a density of from 0.90 g/cm³ to 0.925 g/cm³ and a melt index of less than 1.0 g/10 min, the first bulk layer has a thickness of from 15% to 60% based on total thickness of the multilayer film, and the first bulk layer further comprises an antioxidant, the first bulk layer being between the outer sealant layer and a core layer;

C) a first tie layer between the outer sealant layer and the core layer, the first tie layer comprising a first modified polyolefin; and D) the core layer comprising at least one member selected from the group consisting of polyamide, saponified ethylene/vinyl acetate copolymer, polyvinylidene chloride, E) a second tie layer between the core layer and an odor barrier layer, the second tie layer comprising a second modified polyolefin;

F) a third tie layer comprising a modified ethylene/α-olefin copolymer having a density of from 0.89 to 0.93 g/cm³, the third tie being between the second tie layer and the odor barrier layer; and G) the odor barrier layer comprising glycol-modified polyethylene terephthalate (PETG) in an amount of 90 to 100 wt % based on layer weight.

2. A multilayer film for use in packaging organoleptic sensitive products, comprising:

A) an outer sealant layer comprising homogeneous ethylene/α-olefin copolymer having a density of at least 0.906 cm³;

B) a first bulk layer comprising an ethylene/α-olefin copolymer having a density of from 0.89 to 0.93 g/cm³, the first bulk layer being between the outer sealant layer and a core layer;

C) a first tie layer between the outer sealant layer and the core layer, the first tie layer comprising a first modified polyolefin; and D) the core layer comprising at least one member selected from the group consisting of polyamide, saponified ethylene/vinyl acetate copolymer, polyvinylidene chloride, E) a second tie layer between the core layer and an odor barrier layer, the second tie layer comprising a second modified polyolefin;

F) a third tie layer comprising a modified ethylene/α-olefin copolymer having a density of from 0.89 to 0.93 g/cm³, the third tie being between the second tie layer and the odor barrier layer; and G) the odor barrier layer comprising glycol-modified polyethylene terephthalate (PETG) in an amount of 90 to 100 wt % based on layer weight wherein either:

(i) the outer sealant layer further comprises antiblocking particulates and an antioxidant, the outer sealant layer contains less than 10 parts per billion of total organic carbon, the outer sealant layer has thickness of from 5% to 25%, based on total thickness of the multilayer film, and the homogeneous ethylene/alpha-olefin copolymer in the outer sealant layer has a melt index of at least 1.0 g/10 min; or (ii) the homogeneous ethylene/α-olefin copolymer in the outer sealant layer comprises a bimodal homogeneous ethylene/α-olefin copolymer having a density of at least 0.910 cm³ and a melt index of at least 3 g/10 min, and the bimodal homogeneous ethylene/α-olefin copolymer comprises a first homogeneous ethylene/α-olefin copolymer component having a melting point of ≤113° C., and a second homogeneous ethylene/α-olefin copolymer component having a melting point of >113° C.

3. A multilayer film for use in packaging organoleptic sensitive products, comprising:
   A) an outer sealant layer comprising homogeneous ethylene/α-olefin copolymer having a density of at least 0.906 cm$^3$;
   B) a first bulk layer comprising an ethylene/α-olefin copolymer having a density of from 0.89 to 0.93 g/cm$^3$, the first bulk layer being between the outer sealant layer and a core layer;
   C) a first tie layer between the outer sealant layer and the core layer, the first tie layer comprising a first modified polyolefin; and
   D) the core layer comprising at least one member selected from the group consisting of polyamide, saponified ethylene/vinyl acetate copolymer, polyvinylidene chloride,
   E) a second tie layer between the core layer and an odor barrier layer, the second tie layer comprising a second modified polyolefin;
   F) a third tie layer comprising a modified ethylene/α-olefin copolymer having a density of from 0.89 to 0.93 g/cm$^3$, the third tie being between the second tie layer and the odor barrier layer; and
   G) the odor barrier layer comprising glycol-modified polyethylene terephthalate (PETG) in an amount of 90 to 100 wt % based on layer weight,
   wherein the core layer comprises polyamide 6/66, and the core layer has a thickness of from 13% to 25%, based on total thickness of the multilayer film.

4. The multilayer film according to claim 1, wherein the odor barrier layer has a thickness of from 1% to 15% based on total thickness of the multilayer film, wherein
   the anhydride-modified polyolefin comprises at least one single site catalyzed anhydride-modified ethylene/α-olefin copolymer selected from the group consisting of anhydride-modified linear low density polyethylene, anhydride-modified very low density polyethylene, and anhydride-modified ultra low density polyethylene, and
   the acid-modified polyolefin comprises at least one single site catalyzed acid-modified ethylene/α-olefin copolymer selected from the group consisting of acid-modified linear low density polyethylene, acid-modified very low density polyethylene, and acid-modified ultra low density polyethylene.

5. The multilayer film according to claim 4, wherein the odor barrier layer comprises polydimethylsiloxane heat-release agent, silica antiblocking agent, and wax slip agent.

6. The multilayer film according to claim 1, wherein the first tie layer contains less than 10 parts per billion of total organic carbon.

7. A multilayer film for use in packaging organoleptic sensitive products, comprising:
   A) an outer sealant layer comprising homogeneous ethylene/α-olefin copolymer having a density of at least 0.906 cm$^3$;
   B) a first bulk layer comprising an ethylene/α-olefin copolymer having a density of from 0.89 to 0.93 g/cm$^3$, the first bulk layer being between the outer sealant layer and a core layer;
   C) a first tie layer between the outer sealant layer and the core layer, the first tie layer comprising a first modified polyolefin; and
   D) the core layer comprising at least one member selected from the group consisting of polyamide, saponified ethylene/vinyl acetate copolymer, polyvinylidene chloride,
   E) a second tie layer between the core layer and an odor barrier layer, the second tie layer comprising a second modified polyolefin;
   F) a third tie layer comprising a modified ethylene/α-olefin copolymer having a density of from 0.89 to 0.93 g/cm$^3$, wherein the modified ethylene/α-olefin copolymer in the third tie layer has a density of from 0.89 to 0.920 g/cm$^3$, and a melt index of less than 2.0 g/10 min, and the third tie layer further comprises an antioxidant, the third tie being between the second tie layer and the odor barrier layer; and
   G) the odor barrier layer comprising glycol-modified polyethylene terephthalate (PETG) in an amount of 90 to 100 wt % based on layer weight.

8. A process for producing a multilayer film comprising coextruding a multilayer film for use in packaging organoleptic sensitive products, the coextruded layers comprising:
   A) an outer sealant layer comprising homogeneous ethylene/α-olefin copolymer having a density of at least 0.906 g/cm$^3$;
   B) a first bulk layer comprising an ethylene/α-olefin copolymer having a density of from 0.89 to 0.93 g/cm$^3$, wherein the ethylene/α-olefin copolymer in the first bulk layer is a single site catalyzed copolymer having a density of from 0.90 g/cm$^3$ to 0.925 g/cm$^3$ and a melt index of less than 1.0 g/10 min, the first bulk layer has a thickness of from 15% to 60% based on total thickness of the multilayer film, and the first bulk layer further comprises an antioxidant, the first bulk layer being between the outer sealant layer and a core layer;
   C) a first tie layer between the outer sealant layer and the core layer, the first tie layer comprising a first modified polyolefin;
   D) the core layer comprising at least one member selected from the group consisting of polyamide, saponified ethylene/vinyl acetate copolymer, polyvinylidene chloride;
   E) a second tie layer between the core layer and an odor barrier layer, the second tie layer comprising a second modified polyolefin;
   F) a third tie layer comprising a modified ethylene/α-olefin copolymer having a density of from 0.89 to 0.93 g/cm$^3$, the third tie layer being between the second tie layer and the odor barrier layer; and
   G) the odor barrier layer comprising glycol-modified polyethylene terephthalate (PETG) in an amount of 90 to 100 wt % based on layer weight.

9. The process according to claim 8, wherein the coextrusion is carried out in an upward blown film process and the outer sealant layer is coextruded at a temperature of from 345° F. to 395° F., and the multilayer film has an elongation at break of at least 200% measured in accordance with ASTM D 882 at 23° C.

10. The process according to claim 8, wherein the coextrusion is carried out in a downward cast film process and the outer sealant layer is coextruded at a temperature of from 345° F. to 395° F., and the multilayer film has an elongation at break of at least 200% measured in accordance with ASTM D 882 at 23° C.

11. The multilayer film according to claim 1, wherein the outer sealant layer is sealed to itself to form a form-fill-seal packaging article comprising:

a) a backseam fin seal running a length of the packaging article, the backseam fin seal being a heat seal of the seal layer to itself, the backseam fin seal converting the multilayer film into a backseamed tubing,
b) a first end seal at a first end of the backseamed tubing, the first end seal being transverse to the backseam fin seal, the first end seal conforming a first end seal portion of the backseamed tubing into a first lay-flat configuration; and
c) a second end seal at a second end of the backseamed tubing, the second end seal also being transverse to the backseam fin seal, the second end seal conforming a second end seal portion of the backseamed tubing into a second lay-flat configuration.

12. The form-fill-seal packaging article according to claim 11, wherein the multilayer film has an elongation at break of at least 200% measured in accordance with ASTM D 882 at 23° C., and wherein the packaging article further comprises a fitment for dispensing a flowable product, the fitment being installed in the multilayer film.

13. A multilayer laminate comprising:
A) a coextruded multilayer film comprising:
  i) an outer sealant layer comprising homogeneous ethylene/α-olefin copolymer having a density of at least 0.906 g/cm$^3$;
  ii) a first bulk layer comprising an ethylene/α-olefin copolymer having a density of from 0.89 to 0.93 g/cm$^3$, the first bulk layer being between the outer sealant layer and a core layer;
  iii) a first tie layer between the outer sealant layer and the core layer, the first tie layer comprising a first modified polyolefin;
  iv) the core layer comprising at least one member selected from the group consisting of polyamide, saponified ethylene/vinyl acetate copolymer, polyvinylidene chloride;
  v) a second tie layer between the core layer and a skin layer, the second tie layer comprising a second modified polyolefin;
  vi) a second bulk layer comprising an ethylene/α-olefin copolymer having a density of from 0.89 to 0.93 g/cm$^3$, the second bulk layer being between the second tie layer and the skin layer; and
  vii) the skin layer comprising at least one member selected from the group consisting of polyolefin, polyamide, polyvinylidene chloride, and ethylene/vinyl alcohol copolymer;
B) a lamination adhesive layer having a first principal surface adhered to the surface of the skin layer opposite the second bulk layer of the multilayer film;
C) an odor barrier layer comprising glycol-modified polyethylene terephthalate (PETG) in an amount of 90 to 100 wt % based on layer weight.

14. The multilayer film according to claim 11, further comprising
viii) a second bulk layer comprising an ethylene/α-olefin copolymer having a density of from 0.89 to 0.93 g/cm$^3$, the second bulk layer being between the second tie layer and the skin layer; and
ix) the skin layer comprising at least one member selected from the group consisting of polyolefin, polyamide, polyvinylidene chloride, and ethylene/vinyl alcohol copolymer;
x) a lamination adhesive layer having a first principal surface adhered to the surface of the skin layer opposite the second bulk layer of the multilayer film; and
the odor barrier layer has a first principal surface directly or indirectly adhered to the second principal surface of the lamination adhesive layer.

15. The multilayer film according to claim 1 formed into an inner pouch positioned inside an outer pouch.

16. The multilayer film according to claim 1 formed into a packaged product comprising an organoleptic sensitive product inside a hermetically sealed form-fill-seal packaging article, the outer sealant layer of the multilayer film being sealed to itself to form a
packaging article comprising:
a) a backseam fin seal running a length of the packaging article, the backseam fin seal being a heat seal of the seal layer to itself, the backseam fin seal converting the multilayer film into a backseamed tubing,
b) a first end seal at a first end of the backseamed tubing, the first end seal being transverse to the backseam fin seal, the first end seal conforming a first end seal portion of the backseamed tubing into a first lay-flat configuration; and
c) a second end seal at a second end of the backseamed tubing, the second end seal also being transverse to the backseam fin seal, the second end seal conforming a second end seal portion of the backseamed tubing into a second lay-flat configuration.

17. The packaged product according to claim 16, wherein the multilayer film further comprises:
vii) the skin layer comprising at least one member selected from the group consisting of polyolefin, polyamide, polyvinylidene chloride, and ethylene/vinyl alcohol copolymer;
viii) a lamination adhesive layer having a first principal surface adhered to the surface of the skin layer opposite the second bulk layer of the multilayer film; and
ix) an odor barrier layer having a first principal surface directly or indirectly adhered to the second principal surface of the lamination adhesive layer.

* * * * *